US008652001B2

(12) United States Patent
Iwase et al.

(10) Patent No.: US 8,652,001 B2
(45) Date of Patent: Feb. 18, 2014

(54) VEHICLE DRIVING APPARATUS

(75) Inventors: Mikio Iwase, Anjo (JP); Tomohide Suzuki, Kariya (JP); Tatsuya Okishima, Chiryu (JP); Toshihiko Kamiya, Toyota (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/505,074

(22) PCT Filed: Dec. 17, 2010

(86) PCT No.: PCT/JP2010/072754
§ 371 (c)(1),
(2), (4) Date: Jun. 6, 2012

(87) PCT Pub. No.: WO2011/074662
PCT Pub. Date: Jun. 23, 2011

(65) Prior Publication Data
US 2012/0242199 A1    Sep. 27, 2012

(30) Foreign Application Priority Data

Dec. 18, 2009   (JP) .................................. 2009-288133

(51) Int. Cl.
*H02P 15/00* (2006.01)
(52) U.S. Cl.
USPC ............................................................. 477/8
(58) Field of Classification Search
USPC .................. 477/3, 6–8; 903/902, 912, 915;
180/65.21, 65.22, 65.245; 74/606 R
See application file for complete search history.

(56) References Cited

U.S. PATENT DOCUMENTS

| 6,258,001 | B1 | 7/2001 | Wakuta et al. |
| 6,340,339 | B1 | 1/2002 | Tabata et al. |
| 6,478,101 | B1 | 11/2002 | Taniguchi et al. |
| 6,935,450 | B1 | 8/2005 | Tsuzuki et al. |

(Continued)

FOREIGN PATENT DOCUMENTS

| JP | A-2000-085386 | 3/2000 |
| JP | A-2000-085387 | 3/2000 |

(Continued)

OTHER PUBLICATIONS

Jan. 18, 2011 Search Report issued in Application No. PCT/JP2010/072754 (with partial English translation).

*Primary Examiner* — Justin Holmes
(74) *Attorney, Agent, or Firm* — Oliff PLC

(57) ABSTRACT

In a vehicle driving apparatus including a rotating electrical machine having a rotor and a case housing a power transmission device, a second projecting portion formed on a front cover member of the power transmission device is supported rotatably relative to a first projecting portion formed on a support wall of the case via a support bearing, a positioning fitting portion is provided to position a rotor support member for supporting the rotor relative to the front cover member in the radial direction, a torque transmitting coupling portion is provided on a radial direction outer side of the positioning fitting portion to couple the rotor support member and the front cover member so as to be capable of transmitting torque, and the positioning fitting portion and the torque transmitting coupling portion are respectively disposed to overlap a rotary support portion in an axial direction.

10 Claims, 4 Drawing Sheets

(56) References Cited

U.S. PATENT DOCUMENTS

| | | | |
|---|---|---|---|
| 7,509,802 B2* | 3/2009 | Hammond et al. | 60/330 |
| 8,333,680 B2* | 12/2012 | Kasuya et al. | 477/5 |
| 8,376,905 B2* | 2/2013 | Kasuya et al. | 477/5 |
| 2012/0323425 A1* | 12/2012 | Suyama et al. | 701/22 |
| 2013/0035202 A1* | 2/2013 | Ideshio et al. | 477/5 |

FOREIGN PATENT DOCUMENTS

| | | |
|---|---|---|
| JP | A-2000-289475 | 10/2000 |
| JP | A-2001-163071 | 6/2001 |
| JP | A-2002-103998 | 4/2002 |
| JP | A-2006-137406 | 6/2006 |
| JP | A-2006-160096 | 6/2006 |

* cited by examiner

US 8,652,001 B2

VEHICLE DRIVING APPARATUS

INCORPORATION BY REFERENCE

The disclosure of Japanese Patent Application No. 2009-288133 filed on Dec. 18, 2009 including the specification, drawings and abstract is incorporated herein by reference in its entirety.

BACKGROUND OF THE INVENTION

The present invention relates to a vehicle driving apparatus having at least two types of drive power sources, such as a rotating electrical machine and an engine, wherein drive power output by at least the rotating electrical machine is output via a power transmission device such as a torque converter.

DESCRIPTION OF THE RELATED ART

A vehicle installed not only with an engine (an internal combustion engine), which is used typically as a drive power source for vehicles such as automobiles, but also with a rotating electrical machine serving as a second drive power source has been developed in the related art. In this type of vehicle, the rotating electrical machine is used as a motor/generator. The rotating electrical machine outputs drive power either together with the engine or individually, and this drive power is transmitted to a power transmission device in order to drive the vehicle. Alternatively, drive power is transmitted to the rotating electrical machine from the power transmission device or the engine to cause the rotating electrical machine to operate as a power generator.

In this type of vehicle driving apparatus, the rotating electrical machine must be coupled to the power transmission device or the engine so that drive power can be transmitted therebetween. Moreover, the rotating electrical machine must be supported to be capable of rotating about an axial center, similarly to the power transmission device and so on. In this case, the rotating electrical machine is preferably coupled so that an amount of transmittable drive power, or in other words shaft torque, can be sufficiently large, and so that an axial center precision is sufficiently high.

Furthermore, the axial center is defined using a case, which is a non-rotary member housing the power transmission device, as a reference, and therefore each rotary member must be supported by a support portion formed on the case to be capable of rotating about the axial center via a support bearing or the like.

With regard to this point, in a vehicle driving apparatus described in Japanese Patent Application Publication No. 2000-085386, an input shaft for transmitting the drive power of an engine to a power transmission device and a front cover of the power transmission device are coupled to rotate integrally, a hub is provided near a coupling portion of the input shaft, and a support member of a rotor is coupled to the hub to be capable of transmitting torque thereto and axially aligned therewith.

Further, an axial center of the input shaft is defined by a support portion formed on the case via a support bearing, and the vehicle driving apparatus and rotor coupled to the input shaft are axially aligned such that respective coupling portions align with the axial center of the input shaft.

When, in a vehicle driving apparatus, a rotating electrical machine is disposed in series with an engine and a power transmission device on an identical axial center, it is desirable to reduce an overall axial direction length of the vehicle driving apparatus in order to improve the ease with which the vehicle driving apparatus is installed in a vehicle.

With regard to this point, in the vehicle driving apparatus described in Japanese Patent Application Publication No. 2000-085386, a rotating electrical machine is housed in the case together with the power transmission device, and the coupling portion between the hub of the input shaft and the support member of the rotor is disposed in a space between a support wall extending to a radial direction inner side of the case and the front cover of the power transmission device.

SUMMARY OF THE INVENTION

However, with the technique described in Japanese Patent Application Publication No. 2000-085386, the support member of the rotor is coupled to be capable of transmitting torque and axially aligned in a single coupling portion between the hub of the input shaft and the rotor support member, and it is therefore difficult to improve an axial support precision of the rotor and a torque transmission capacity simultaneously. In other words, to improve the torque transmission capacity, a member thickness of the coupling portion is preferably increased, and the coupling portion is preferably disposed in a position removed from the axial center. To improve the axial support precision of the rotor, on the other hand, the member thickness of the coupling portion is preferably reduced, and the coupling portion is preferably disposed in a position near the axial center so as to reduce a circumference to be processed. In so doing, the coupling portion can be processed more easily, leading to an improvement in axial alignment precision. Hence, an improvement in the axial support precision of the rotor is incompatible with an improvement in the torque transmission capacity, and with the technique described in Japanese Patent Application Publication No. 2000-085386, it is difficult to satisfy these incompatible requirements at the same time.

Further, to shorten the overall axial direction length of the vehicle driving apparatus, a coupling member and a rotary support mechanism must be disposed by making effective use of a radial direction space. However, Japanese Patent Application Publication No. 2000-085386 does not disclose a method of disposing the support member for achieving simultaneous improvements in the axial support precision of the rotor and the torque transmission capacity.

The present invention has been designed in consideration of the problems described above, and an object thereof is to couple a rotating electrical machine and a power transmission device so that simultaneous improvements can be made in an axial support precision of a rotor and a torque transmission capacity, and to shorten an overall axial direction length of a vehicle driving apparatus by making effective use of a space on a radial direction outer side of a rotary support portion between a case and the rotating electrical machine or the power transmission device.

To achieve the object described above, a vehicle driving apparatus according to a first aspect of the present invention includes a rotating electrical machine having a rotor that rotates about an axial center, a power transmission device to which drive power is transmitted from the rotating electrical machine and an engine, and a case housing the rotating electrical machine and the power transmission device. In the vehicle driving apparatus, the case includes a support wall that extends at least to a radial direction inner side and a tubular first projecting portion that is formed integrally with the support wall so as to project from the support wall in an axial direction to the power transmission device side, the power transmission device includes a front cover member extending at least in a radial direction and a tubular second projecting portion that projects to the support wall side in the axial direction, the second projecting portion is supported rotatably relative to the first projecting portion via a support bearing, the rotor includes a rotor support member that extends at least to the radial direction inner side to support the rotor, a positioning fitting portion is provided on a radial direction outer side of the second projecting portion to fit the rotor support member to the front cover member so that the rotor support member is positioned in the radial direction, a torque transmitting coupling portion is provided on the radial direction outer side of the positioning fitting portion at a remove from the positioning fitting portion to couple the rotor support member and the front cover member so as to be capable of transmitting torque, and the positioning fitting portion and the torque transmitting coupling portion are respectively disposed to overlap a rotary support portion, which is constituted by the first projecting portion, the second projecting portion, and the support bearing, in the axial direction.

Note that in this application, the "axial direction" corresponds to a direction of a rotary axis center of the rotor. Accordingly, the "radial direction" is an orthogonal direction to the rotary axis center of the rotor, and a "circumferential direction" is a rotation direction about the rotary axis center of the rotor.

Further, when it is stated in this application that two members are disposed to "overlap" in a certain direction, this means that the two members respectively are disposed at least partially in identical positions in this direction.

Furthermore, the term "rotating electrical machine" is used as a concept including a motor, a generator, and a motor/generator that functions as both a motor and a generator as necessary.

According to the first aspect, the positioning fitting portion and the torque transmitting coupling portion are formed at a remove, and the positioning fitting portion is disposed on the radial direction inner side while the torque transmitting coupling portion is disposed on the radial direction outer side. Therefore, the axial support precision of the rotor and the torque transmission capacity can be improved simultaneously. More specifically, the positioning fitting portion is not required to transmit torque, and therefore a member thickness of the rotor support member or the front cover member in the vicinity of the positioning fitting portion can be reduced. As a result, the positioning fitting portion can be processed easily, enabling an improvement in the processing precision of a fitting surface required for radial direction positioning, and an axial direction length in the vicinity of the positioning fitting portion can be shortened. Furthermore, the positioning fitting portion is disposed on the radial direction inner side of the torque transmission portion, and therefore a reduction in a processed circumference can be achieved, enabling a further improvement in the processing precision of the positioning fitting portion. Meanwhile, the torque transmitting coupling portion is disposed on the radial direction outer side of the positioning fitting portion, and therefore a shaft torque that can be transmitted by the torque transmitting coupling portion can be increased easily based on the principle of leverage.

Further, the positioning fitting portion and the torque transmitting coupling portion are respectively disposed to overlap the rotary support portion, which is constituted by the first projecting portion, the second projecting portion, and the support bearing, in the axial direction, and therefore a space on the radial direction outer side of the rotary support portion can be used effectively to dispose the positioning fitting portion and the torque transmitting coupling portion. As a result, the overall axial direction length of the vehicle driving apparatus can be shortened.

Here, according to a second aspect of the present invention, the vehicle driving apparatus may be constituted such that the first projecting portion, the second projecting portion, the support bearing, the rotor support member, the positioning fitting portion, and the torque transmitting coupling portion are respectively disposed to overlap the rotor in the axial direction.

According to the second aspect, a space on the radial direction inner side of the rotor can be used effectively to dispose the first projecting portion, the second projecting portion, the support bearing, the rotor support member, the positioning fitting portion, and the torque transmitting coupling portion, and therefore the overall axial direction length of the vehicle driving apparatus can be shortened.

Further, according to a third aspect of the present invention, the rotor support member may include an offset portion formed on the radial direction inner side of the torque transmitting coupling portion at an offset to the front cover member side in the axial direction, and a rotation sensor may be disposed between the support wall and the rotor support member in a position that overlaps the offset portion of the rotor support member in the radial direction.

In many cases, a coupling portion constituting the torque transmitting coupling portion is subjected to plane forming processing or the like and is therefore formed on the front cover member so as to project in the axial direction. Accordingly, a part of the front cover member on the radial direction inner side of the torque transmitting coupling portion is withdrawn to an opposite side to the rotor support member in the axial direction. Using this withdrawn part, the rotor support member is formed at an offset to the front cover member side in the axial direction on the radial direction inner side of the torque transmitting coupling portion, and therefore a space between the rotor support member and the support wall can be widened in the axial direction. The rotation sensor can therefore be disposed in the space between the rotor support member and the support wall, and as a result, the overall axial direction length of the vehicle driving apparatus can be shortened.

Further, according to a fourth aspect of the present invention, the rotation sensor may be disposed to overlap the rotary support portion in the axial direction.

According to the fourth aspect, a space on the radial direction outer side of the rotary support portion can be used effectively to dispose the rotation sensor, as well as the positioning fitting portion and the torque transmitting coupling portion, and therefore the overall axial direction length of the vehicle driving apparatus can be shortened.

Further, according to a fifth aspect of the present invention, the rotation sensor may be disposed to overlap the rotor in the axial direction.

According to the fifth aspect, a space on the radial direction inner side of the rotor can be used effectively to dispose the rotation sensor, and therefore the overall axial direction length of the vehicle driving apparatus can be shortened.

Further, according to a sixth aspect of the present invention, the front cover member may include a third projecting portion that projects to the support wall side in the axial direction on the radial direction outer side of the second projecting portion, and a radial direction outside surface of the third projecting portion may constitute a front cover member side fitting surface of the positioning fitting portion, the rotor support member being fitted to the radial direction outside surface of the third projecting portion.

According to the sixth aspect, the third projecting portion is formed to project to the support wall side in the axial direction from the front cover member, and therefore a space between the front cover member and the support wall can be used effectively to form the front cover member side fitting surface constituting the positioning fitting portion.

Furthermore, the third projecting portion serves as an axial direction projecting portion, and therefore the radial direction outside surface of the third projecting portion can be processed with a high degree of precision to form a fitting surface for positioning the rotor support member in the radial direction. As a result, an improvement can be achieved in processing precision for positioning the positioning fitting portion, leading to an improvement in the radial direction positioning precision of the rotor.

Further, according to a seventh aspect of the present invention, the third projecting portion may be disposed to overlap the rotary support portion in the axial direction.

According to the seventh aspect, the space on the radial direction outer side of the rotary support portion can be used effectively to dispose the third projecting portion, and therefore the overall axial direction length of the vehicle driving apparatus can be shortened.

Further, according to an eighth aspect of the present invention, the third projecting portion may be disposed to overlap the rotor in the axial direction.

According to the eighth aspect, the space on the radial direction inner side of the rotor can be used effectively to dispose the third projecting portion, and therefore the overall axial direction length of the vehicle driving apparatus can be shortened.

Further, according to a ninth aspect of the present invention, the support bearing may be attached between a radial direction inside surface of the first projecting portion and a radial direction outside surface of the second projecting portion, the rotor support member may include a tubular fourth projecting portion that projects to the support wall side in the axial direction on the radial direction inner side of the torque transmitting coupling portion and the radial direction outer side of the first projecting portion, the fourth projecting portion may be disposed to overlap the first projecting portion in the axial direction, and the rotation sensor may be disposed between a radial direction inside surface of the fourth projecting portion and a radial direction outside surface of the first projecting portion.

According to the ninth aspect, the fourth projecting portion is formed to project to the support wall side in the axial direction from the rotor support member, and therefore the space between the rotor support member and the support wall can be used effectively to form a projecting portion for attaching the rotation sensor to the rotor side. Further, the fourth projecting portion is disposed on the radial direction inner side of the torque transmitting coupling portion, and therefore the fourth projecting portion can be disposed to avoid the torque transmitting coupling portion in the radial direction and such that the rotation sensor overlaps the offset portion in the radial direction. Furthermore, the rotation sensor can be disposed in a radial direction space formed between the fourth projecting portion and the first projecting portion. Hence, the space between the rotor support member and the support wall can be used effectively in the radial direction to dispose the rotation sensor, and as a result, an increase in the overall axial direction length of the vehicle driving apparatus can be suppressed.

Further, the rotation sensor is attached to the radial direction outside surface of the first projecting portion and the support bearing is attached to the radial direction inside surface of the first projecting portion, and therefore both the radial direction inside surface and the radial direction outside surface of the first projecting portion can be used effectively to attach the support bearing and the rotation sensor. Hence, there is no need to form a new projecting portion for attaching the rotation sensor to the support wall, and therefore the projecting portion can be shared. Accordingly, the space between the front cover member and the support wall can be used effectively in the radial direction to dispose respective constitutional members, and as a result, the overall axial direction length of the vehicle driving apparatus can be shortened.

Further, according to a tenth aspect of the present invention, the fourth projecting portion may be disposed to overlap the rotary support portion in the axial direction.

According to the tenth aspect, the space on the radial direction outer side of the rotary support portion can be used effectively to dispose the fourth projecting portion, and therefore the overall axial direction length of the vehicle driving apparatus can be shortened.

Further, according to an eleventh aspect of the present invention, the fourth projecting portion may be disposed to overlap the rotor in the axial direction.

According to the eleventh aspect, the space on the radial direction inner side of the rotor can be used effectively to dispose the fourth projecting portion, and therefore the overall axial direction length of the vehicle driving apparatus can be shortened.

Further, according to a twelfth aspect of the present invention, the support bearing may be attached between a radial direction outside surface of the first projecting portion and a radial direction inside surface of the second projecting portion, the rotor support member may include a tubular fourth projecting portion that projects to the support wall side in the axial direction on the radial direction inner side of the torque transmitting coupling portion, the support wall may include a tubular fifth projecting portion that projects to the rotor support member side in the axial direction on the radial direction outer side of the rotary support portion and the radial direction inner side of the fourth projecting portion, the fourth projecting portion and the fifth projecting portion may be disposed to overlap each other in the axial direction, and the rotation sensor may be disposed between a radial direction inside surface of the fourth projecting portion and a radial direction outside surface of the fifth projecting portion.

According to the twelfth aspect, the fourth projecting portion is formed to project to the support wall side in the axial direction from the rotor support member, and the fifth projecting portion is formed to project to the rotor support member side in the axial direction from the support wall. Therefore, the space between the rotor support member and the support wall can be used effectively to form a projecting portion for attaching the rotation sensor to the rotor side and the support wall side. Further, the fourth projecting portion is disposed on the radial direction inner side of the torque transmitting coupling portion, and therefore the fourth projecting portion can be disposed to avoid the torque transmitting coupling portion in the radial direction and such that the rotation sensor overlaps the offset portion in the radial direction. Furthermore, the rotation sensor can be disposed in a radial direction space formed between the fourth projecting portion and the fifth projecting portion. Hence, the space between the rotor support member and the support wall can be used effectively in the radial direction to dispose the rotation sensor, and as a result, an increase in the overall axial direction length of the vehicle driving apparatus can be suppressed.

Further, the fifth projecting portion is formed on the radial direction outer side of the rotary support portion, and therefore the rotary support portion can be designed separately from the constitution for attaching the rotation sensor, leading to respective improvements in design freedom. As a result, the support bearing can be attached between the radial direction outside surface of the first projecting portion and the radial direction inside surface of the second projecting portion.

Further, according to a thirteenth aspect of the present invention, the fourth projecting portion and the fifth projecting portion may be respectively disposed to overlap the rotary support portion in the axial direction.

According to the thirteenth aspect, the space on the radial direction outer side of the rotary support portion can be used effectively to dispose the fourth projecting portion and the fifth projecting portion, and therefore an increase in the overall axial direction length of the vehicle driving apparatus can be suppressed.

Further, according to a fourteenth aspect of the present invention, the fourth projecting portion and the fifth projecting portion may be respectively disposed to overlap the rotor in the axial direction.

According to the fourteenth aspect, the space on the radial direction inner side of the rotor can be used effectively to dispose the fourth projecting portion and the fifth projecting portion, and therefore an increase in the overall axial direction length of the vehicle driving apparatus can be suppressed.

DETAILED DESCRIPTION OF THE EMBODIMENTS

1. First Embodiment

Figure 3:
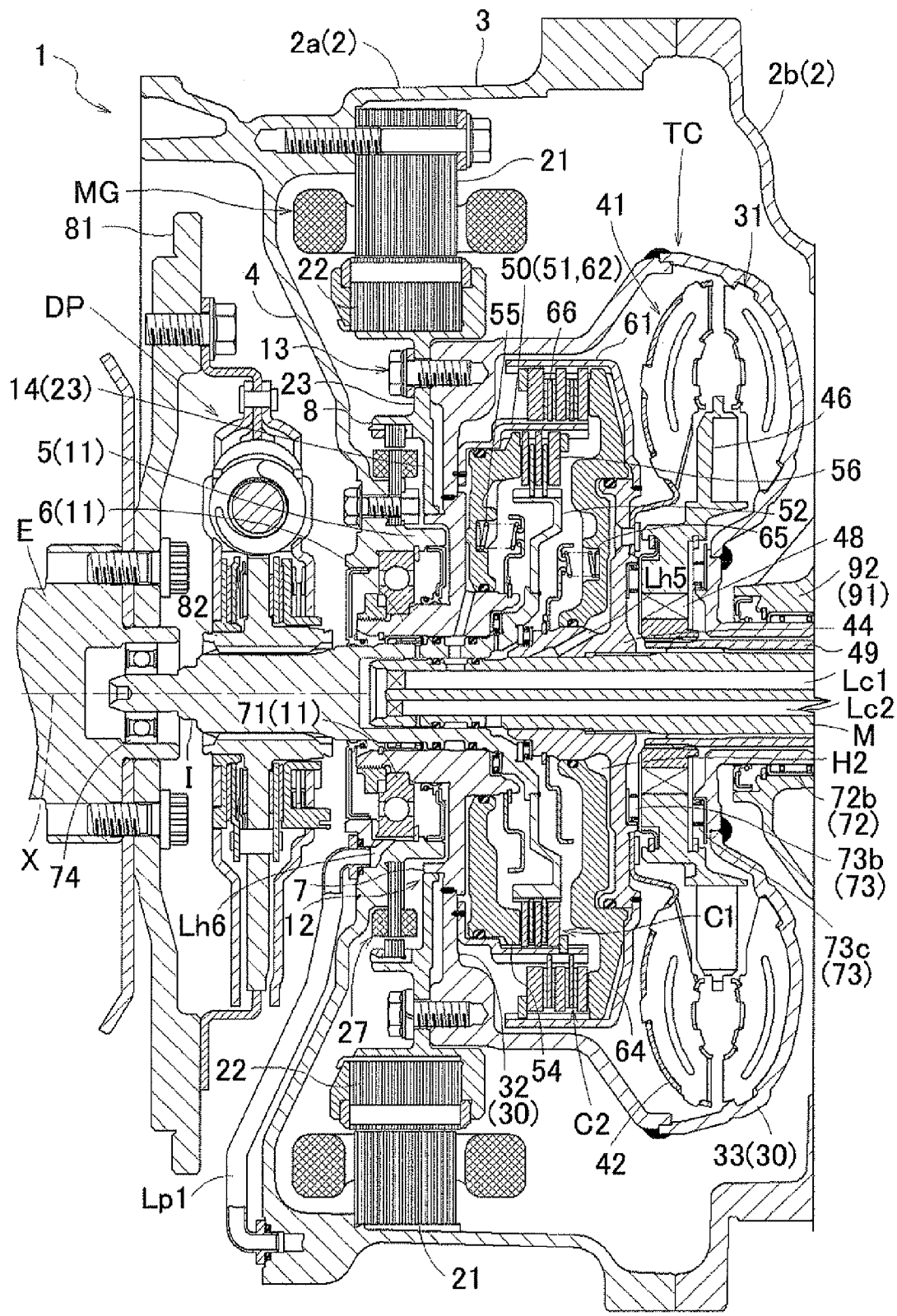
FIG. 3 is a partial sectional view of the vehicle driving apparatus according to the first embodiment.

A first embodiment of the present invention will be described on the basis of the drawings. In this embodiment, a case in which a vehicle driving apparatus according to the present invention is applied to a hybrid driving apparatus 1 will be described as an example. The hybrid driving apparatus 1 is a driving apparatus for a hybrid vehicle that uses one or both of an engine E and a rotating electrical machine MG as vehicle drive power sources. As shown in FIG. 3, the hybrid driving apparatus 1 includes the rotating electrical machine MG which has a rotor 22 that rotates about an axial center X, a torque converter TC that serves as a power transmission device to which drive power from the engine E and the rotating electrical machine MG is transmitted, and a driving apparatus case 2 (to be referred to simply as a "case 2" hereafter) housing the rotating electrical machine MG and the torque converter TC. Note that in the following description, unless otherwise indicated, an axial direction, a circumferential direction, and a radial direction are defined using the axial center X as a reference.

Figure 1:
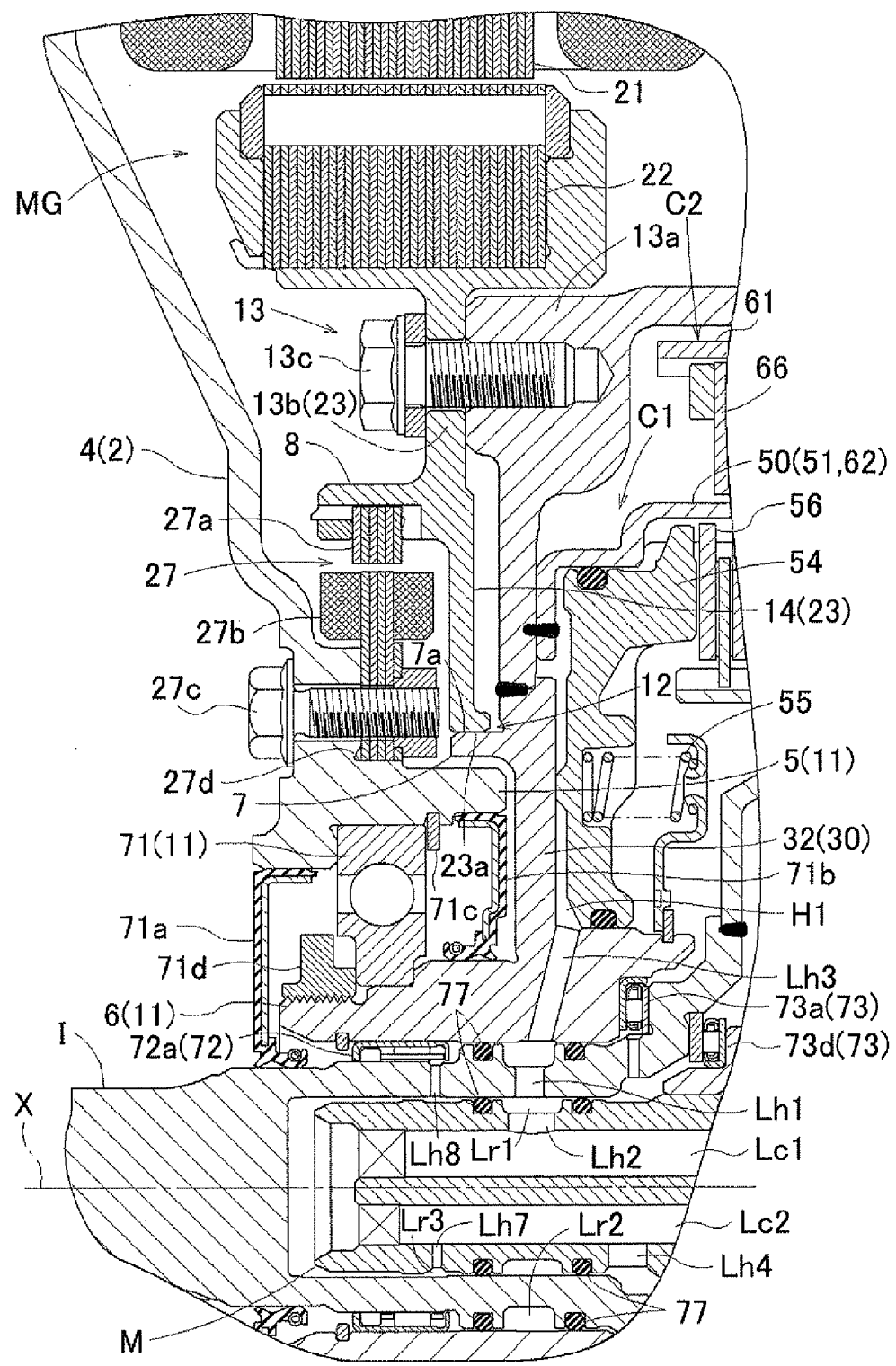
FIG. 1 is a sectional view showing the main parts of a vehicle driving apparatus according to a first embodiment.

As shown in FIGS. 1 and 3, the hybrid driving apparatus 1 according to this embodiment, constituted as described above, includes the following features. Specifically, a positioning fitting portion 12 is provided to position a rotor support member 23, which extends to a radial direction inner side of the rotor 22 so as to support the rotor 22, in the radial direction by fitting the rotor support member 23 to a front cover member 32 of the torque converter TC when the rotor support member 22 is coupled to the front cover member 32; a torque transmitting coupling portion 13 is provided to couple the rotor support member 23 and the front cover member 32 to each other to be capable of transmitting torque; and the torque transmitting coupling portion 13 is formed at a remove from the positioning fitting portion 12 on a radial direction outer side of the positioning fitting portion 12. Further, a second projecting portion 6 of the front cover member 32 is supported to be capable of rotating relative to a first projecting portion 5 of the case 2 via a support bearing 71. The positioning fitting portion 12 and the torque transmitting coupling portion 13 are respectively disposed to overlap a rotary support portion 11, which is constituted by the first projecting portion 5, the second projecting portion 6, and the support bearing 71, in the axial direction. With these features, the hybrid driving apparatus 1 is realized such that the rotating electrical machine MG and the torque converter TC can be coupled so as to improve an axial support precision of the rotor 22 and a torque transmission capacity simultaneously, and a space between the case 2 and the torque converter TC on the radial direction outer side of the rotary support portion 11 can be used effectively to shorten an overall axial direction length of the hybrid driving apparatus 1. The hybrid driving apparatus 1 according to this embodiment will be described in detail below.

1-1. Overall Constitution of Hybrid Driving Apparatus

Figure 2:
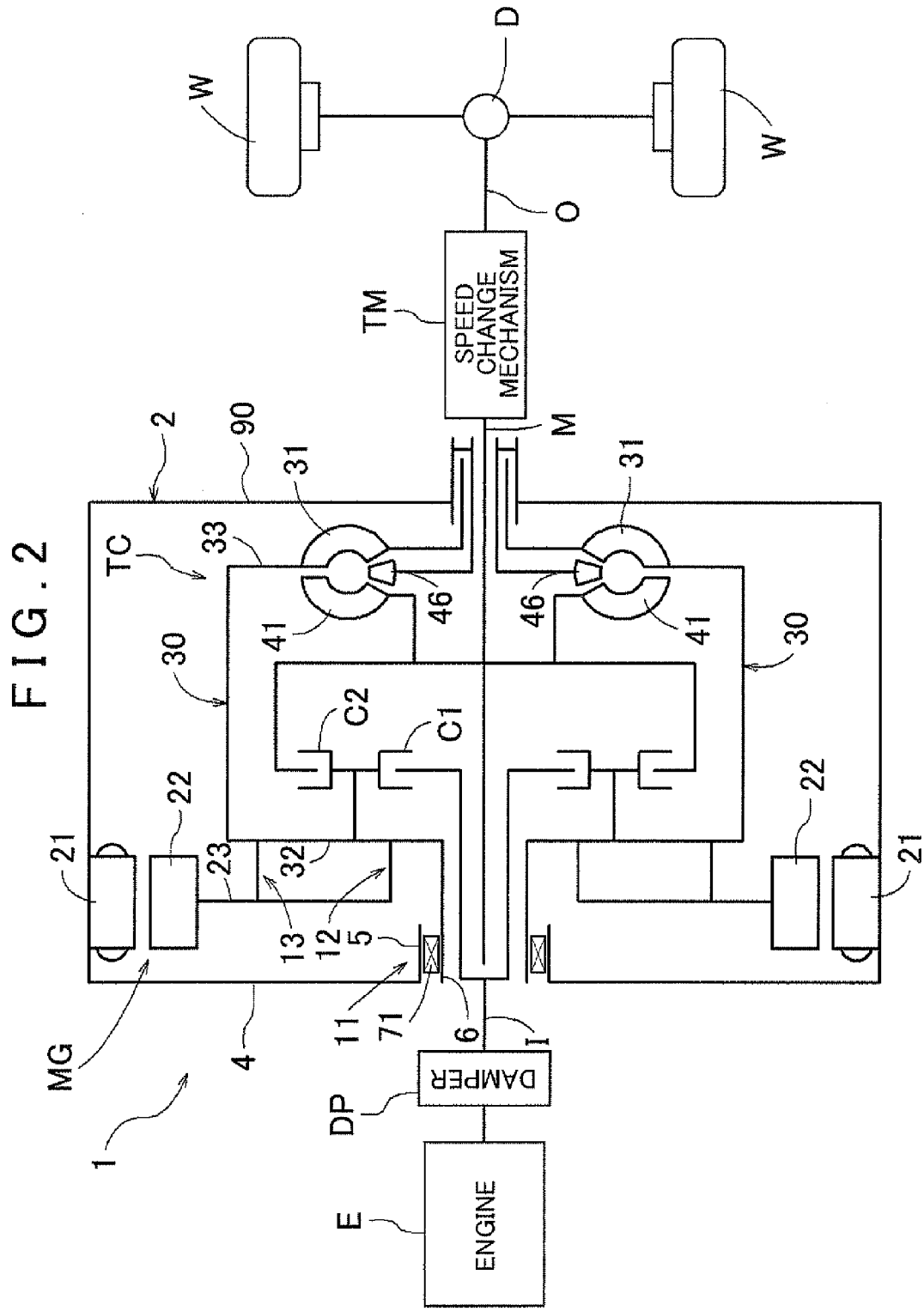
FIG. 2 is a schematic diagram showing an outline of the constitution of the vehicle driving apparatus according to the first embodiment.

First, the overall constitution of the hybrid driving apparatus 1 according to this embodiment will be described. As shown in FIG. 2, the hybrid driving apparatus 1 includes an input shaft I drive-coupled to the engine E, which serves as a first drive power source, the rotating electrical machine MG, which is drive-coupled to the torque converter TC as a second drive power source, a first clutch C1 for connecting and disconnecting drive power between the engine E and the torque converter TC and rotating electrical machine MG, a speed change mechanism TM drive-coupled to the torque converter TC via an intermediate shaft M, and an output shaft O drive-coupled to a vehicle wheel W, all of these components being housed in the case 2.

The engine E is an internal combustion engine driven by burning fuel, and various well known engines, such as a gasoline engine or a diesel engine, for example, may be employed. In this example, an engine output shaft such as a crankshaft of the engine E is drive-coupled to the input shaft I via a damper DP. The engine E and the input shaft I are drive-coupled to the torque converter TC and the rotating electrical machine MG selectively via the first clutch C1. When the first clutch C1 is in an engaged state, the engine E is drive-coupled to the torque converter TC and the rotating electrical machine MG via the input shaft I, and when the first clutch C1 is in a disengaged state, the engine E is separated from the torque converter TC and the rotating electrical machine MG.

The first clutch C1 is provided to be capable of separating the engine E from the rotating electrical machine MG and the torque converter TC. When the first clutch C1 is in the disengaged state (separation state), the vehicle can be driven via the torque converter TC, the speed change mechanism TM, and so on using the drive power of the rotating electrical machine MG alone, i.e. without being affected by the engine E. Further, when the vehicle decelerates or the like, drive power transmitted from the vehicle wheel W can be transmitted to the rotating electrical machine MG alone to generate power. For this purpose, the rotating electrical machine MG is drive-coupled to the torque converter TC. Furthermore, the input shaft I and the torque converter TC are separated by the first clutch C1, and therefore the input shaft I and the torque converter TC are respectively supported rotatably relative to the case 2.

The rotating electrical machine MG is constituted by a stator 21 and the rotor 22, and is capable of functioning as both a motor that generates motive power upon reception of a supply of electric power and a generator that generates electric power upon reception of a supply of motive power. For this purpose, the rotating electrical machine MG is electrically connected to a storage device, not shown in the drawings. In this example, a battery is used as the storage device. Note that a capacitor or the like may also be used favorably as the storage device. The rotating electrical machine MG performs power running upon reception of a supply of electric power from the battery or supplies electric power generated using drive power output from the vehicle wheel W or the engine E to the battery for storage therein. The rotor 22 of the rotating electrical machine MG is drive-coupled to the torque converter TC to rotate integrally with a pump impeller 31 of the torque converter TC. As will be described below, this drive-coupling is realized by coupling the rotor support member 23 of the rotor 22 to the front cover member 32 of the torque converter TC using the torque transmitting coupling portion 13 and the positioning fitting portion 12. Meanwhile, the stator 21 is attached to the case 2, which is a non-rotary member.

The torque converter TC is a device for converting the torque of one or both of the engine E and the rotating electrical machine MG and transmitting the converted torque to the speed change mechanism TM. The torque converter TC includes the pump impeller 31, which is drive-coupled to the front cover member 32 and the rotor 22 of the rotating electrical machine MG to rotate integrally therewith, a turbine runner 41 drive-coupled to the intermediate shaft M to rotate integrally therewith, and a stator 46 provided between the pump impeller 31 and the turbine runner 41. The torque converter TC is capable of performing torque transmission between the drive side pump impeller 31 and the driven side turbine runner 41 via oil charged into the interior thereof.

The torque converter TC also includes a second clutch C2. The second clutch C2 functions as a lockup frictional engagement device of the torque converter TC. The second clutch C2 drive-couples the pump impeller 31 and the turbine runner 41 to rotate integrally so that a differential rotation speed between the pump impeller 31 and the turbine runner 41 is eliminated, and thereby improves a power transmission efficiency. More specifically, when the second clutch C2 is engaged, the torque converter TC transmits the torque of the engine E and the rotating electrical machine MG or the torque of the rotating electrical machine MG directly to the speed change mechanism TM via the intermediate shaft M without passing through the oil in its interior. Further, when the second clutch C2 is engaged, the torque converter TC transmits torque transmitted thereto from the vehicle wheel W via the speed change mechanism TM to the rotating electrical machine MG side without passing through the oil in its interior.

The front cover member 32 of the torque converter TC forms a part of an outer shell support member 30 of the torque converter TC, and is drive-coupled to the pump impeller 31 and the rotor 22 of the rotating electrical machine MG so as to rotate integrally therewith. Further, the first clutch C1 for connecting and disconnecting drive power relative to the input shaft I and the lockup second clutch C2 of the torque converter TC are attached to the front cover member 32. Furthermore, as will be described below, the front cover member 32 includes the second projecting portion 6, and the second projecting portion 6 is supported to be capable of rotating relative to the first projecting portion 5 of the case 2 via the support bearing 71.

The case 2 is a substantially cylindrical non-rotary member housing the torque converter TC and the rotating electrical machine MG in its interior and fixed to a chassis. Further, the case 2 supports respective rotary members such as the input shaft I, the intermediate shaft M, the torque converter TC, and the rotor 22 of the rotating electrical machine MG rotatably on a support portion provided on the engine E side and the speed change mechanism TM side of the case 2. As will be described below, the case 2 includes the first projecting portion 5, which is formed on a support wall 4 of the case 2, and the first projecting portion 5 supports the second projecting portion 6 of the front cover member 32 to be capable of rotating via the support bearing 71. Further, the stator 21 of the rotating electrical machine MG is attached to the case 2.

The speed change mechanism TM is a device for shifting a rotation speed of the intermediate shaft M at a predetermined speed ratio and transmitting the shifted rotation to the output shaft O. An automatic or manual stepped speed change mechanism capable of switching between a plurality of shift speeds having different speed ratios, an automatic continuously variable speed change mechanism capable of modifying the speed ratio continuously, and so on may be used as the speed change mechanism TM. The speed change mechanism TM shifts the rotation speed of the intermediate shaft M at a predetermined speed ratio set at each point in time and performs torque conversion, and then transmits the shifted rotation and the converted torque to the output shaft O. The torque transmitted to the output shaft O from the speed change mechanism TM is distributed to two vehicle wheels W on a left side and a right side via a differential device D. Note that in this embodiment, the input shaft I, the intermediate shaft M, and the output shaft O are disposed coaxially and therefore have a uniaxial constitution.

1-2. Constitutions of Respective Parts of Hybrid Driving Apparatus

Next, the constitutions of the respective parts of the hybrid driving apparatus 1 according to this embodiment will be described with reference to FIGS. 1 and 3. As described above, the hybrid driving apparatus 1 includes the input shaft I, the intermediate shaft M, the output shaft O, the rotating electrical machine MG, the torque converter TC, the speed change mechanism TM, the first clutch C1, the case 2, and so on. The constitutions of these respective parts of the hybrid driving apparatus 1 will be described in detail below.

1-2-1. Engine, Damper

As shown in FIG. 3, a flywheel 81 is coupled to the engine E. Similarly to a flywheel attached to various conventional engines, the flywheel 81 is a disc-shaped member having a large rotary inertial moment for suppressing torque variation in the engine E. The damper DP serving as a damping mechanism is coupled to the flywheel 81. The damper DP is a mechanism for attenuating vibration or variation in the torque input from the flywheel 81 in order to smooth an amplitude of the vibration, and then outputting the smoothed torque. Various constitutions may be used for the damper DP as required. In a typical mechanism, an elastic body such as a spring is interposed between an input side member and an output side member capable of relative rotation, and vibration is attenuated by expansion/contraction of the elastic body. The input side member of the damper DP is coupled to the flywheel 81 and the output side member is coupled to the input shaft I, and therefore the drive power of the engine E is input into the hybrid driving apparatus 1. Further, the flywheel 81 and the damper DP are members that can be employed selectively, and the engine E may be coupled to the input shaft I without one or both thereof. Note that the input side and output side of the damper DP were described here, but torque may also be transmitted from the output side member to the input side member, and therefore mutual torque transmission between the input side member and the output side member of the damper DP is possible.

1-2-2. Driving Apparatus Case

As described above, the case 2 is a substantially cylindrical non-rotary member that houses various housed components such as the torque converter TC and the rotating electrical machine MG in its interior. Further, the case 2 supports respective rotary members such as the input shaft I, the intermediate shaft M, the torque converter TC, and the rotor 22 of the rotating electrical machine MG on respective support portions formed on the engine E side (an axial direction first side) and the speed change mechanism TM side (an axial direction second side) of the case 2 so that these members are capable of rotating about the central axis X, and positions these members in the radial direction. As shown in FIG. 3, the case 2 includes a case peripheral wall 3 covering an outer periphery of each housed component, and the support wall 4, which closes an axial direction first side (a left side in FIG. 3) opening of the case 2 and supports the respective rotary members rotatably on the axial direction first side. The case 2 further includes an intermediate support wall 90 (see FIG. 2) that is disposed between the torque converter TC and the speed change mechanism TM on the axial direction second side (a right side in FIG. 3) and supports the respective rotary members rotatably on the axial direction second side. Furthermore, in this embodiment, the case 2 is formed to be dividable into a first case 2a and a second case 2b attached to the axial direction second side of the first case 2a. Here, an axial direction first side part of the case peripheral wall 3 and the support wall 4 are formed integrally with the first case 2a. Further, an axial direction second side remaining part of the case peripheral wall 3 is formed on the second case 2b, and the intermediate support wall 90 is attached to the second case 2b. The torque converter TC, the rotating electrical machine MG, the first clutch C1, and so on are housed in a space of the case 2 defined by the case peripheral wall 3, the support wall 4, and the intermediate support wall 90. Furthermore, although not shown in FIG. 3, the speed change mechanism TM is housed in the case 2 on the axial direction second side of the intermediate support wall 90.

The support wall 4 is shaped to extend in at least the radial direction, and in this embodiment, the support wall 4 is an annular plate-shaped member that extends in the radial direction and the circumferential direction. The support wall 4 includes the first projecting portion 5, which is formed integrally with the support wall 4 to project in a tubular shape from the support wall 4 to the torque converter TC side (the axial direction second side) in the axial direction. The first projecting portion 5 is formed to project to an inner side of the support wall 4, and therefore no projections need be formed on an outside surface of the support wall 4. As a result, an axial direction distance between the support wall 4 and the damper DP can be shortened, and as will be described below, a radial direction space of the first projecting portion 5 projecting to the inner side of the support wall 4 can be used effectively for attachment of the rotor 22 and a rotation sensor 27 as well as rotatable support and radial direction positioning of the respective rotary members.

In this embodiment, the first projecting portion 5 has a cylindrical shape that projects to the axial direction second side from the vicinity of a radial direction inner peripheral end of the support wall 4. A center of the cylindrical first projecting portion 5 corresponds to the axial center X, and therefore the first projecting portion 5 supports the respective rotary members of the hybrid driving apparatus 1 to be capable of rotating about the axial center X on the axial direction first side of the hybrid driving apparatus 1. Further, an axial direction through hole that connects an inner side and an outer side of the case 2 in the axial direction on the axial direction first side is formed on the radial direction inner side of the first projecting portion 5. The input shaft I penetrates the through hole formed in the support wall 4 of the case 2 such that the input shaft I can transmit drive power between the engine E and the interior of the hybrid driving apparatus 1.

The first projecting portion 5 of the support wall 4 supports the second projecting portion 6 formed on the front cover member 32 of the torque converter TC, as will be described below, to be capable of rotating via the support bearing 71. A support portion constituted by the first projecting portion 5, the second projecting portion 6, and the support bearing 71 constitutes the rotary support portion 11 according to the present invention. The first projecting portion 5, second projecting portion 6, and support bearing 71 constituting the rotary support portion 11 are respectively disposed to overlap the rotor 22 in the axial direction. In this embodiment, the first projecting portion 5 and the second projecting portion 6 are disposed to overlap each other entirely in the axial direction. Further, the support bearing 71 is disposed between a radial direction inside surface of the first projecting portion 5 and a radial direction outside surface of the second projecting portion 6. In other words, the radial direction inside surface of the first projecting portion 5 supports the radial direction outside surface of the second projecting portion 6 via the support bearing 71. In this example, the radial direction inside surface of the cylindrical first projecting portion 5 is fitted to a radial direction outside surface of the support bearing 71 so as to position the support bearing 71 in the radial direction. A radial direction inside surface of the support bearing 71 is fitted to the radial direction outside surface of the cylindrical second projecting portion 6 so as to position the second projecting portion 6 in the radial direction. Hence, the first projecting portion 5 supports the second projecting portion 6 rotatably via the support bearing 71 and positions the second projecting portion 6 in the radial direction. In this embodiment, a ball bearing, which is a type of radial bearing, is used as the support bearing 71. A ball bearing is capable of supporting a comparatively large radial direction load. Note that when it is stated in the present invention that one member overlaps another member entirely in the axial direction, this means that the entirety of the one member has an identical position to at least a part of the other member with respect to the axial direction.

Furthermore, as shown in FIG. 1, a needle bearing 72a is disposed between a radial direction inside surface of the second projecting portion 6 and a radial direction outside surface of the input shaft I. In other words, the radial direction inside surface of the second projecting portion 6 supports the radial direction outside surface of the input shaft I via the needle bearing 72a. Thus, the second projecting portion 6 supports the input shaft I rotatably via the needle bearing 72a and positions the input shaft I in the radial direction. Further, as will be described below, the input shaft I is formed in a hollow cylindrical shape on the axial direction second side of the support wall 4 such that a radial direction inside surface of the cylindrical portion of the input shaft I supports a radial direction outside surface of the intermediate shaft M via an oil film or the like. Thus, the input shaft I supports the intermediate shaft M rotatably via the oil film or the like, and positions the intermediate shaft M in the radial direction. Hence, according to this embodiment, the non-rotary first projecting portion 5 of the support wall 4 is capable of supporting the second projecting portion 6 of the front cover member, the input shaft I, and the intermediate shaft M rotatably and positioning these members in the radial direction. Further, the second projecting portion 6, the input shaft I, and the intermediate shaft M, which are all rotary members, are disposed to overlap the first projecting portion 5 in the axial direction and positioned in the radial direction in positions overlapping the first projecting portion 5 in the axial direction. Therefore, the radial direction positioning precision of the respective rotary members can be improved, and the radial direction space of the first projecting portion 5 can be used effectively to support the respective rotary members rotatably. In particular, an axial direction second side end portion of the input shaft I is formed in a hollow cylindrical shape, and an axial direction first side end portion of the intermediate shaft M is inserted into the radial direction inner side of this cylindrical portion such that the intermediate shaft M overlaps the first projecting portion 5 in the axial direction. Therefore, the radial direction positioning precision can be improved with respect to the intermediate shaft M also, enabling an integral improvement in the radial direction positioning precision in relation to the respective rotary members of the hybrid driving apparatus 1 as a whole. Note that a separate bearing is preferably disposed between the intermediate shaft M and the input shaft I so that the intermediate shaft M can be supported rotatably relative to the input shaft I. In this case, the added bearing is preferably disposed in a position that overlaps the support bearing 71 or the needle bearing 72*a* in the axial direction.

As described above, the first projecting portion 5 positions the support bearing 71 in the radial direction by fitting the support bearing 71 to the radial direction inside surface thereof. As shown in FIG. 1, the axial direction first side of the support bearing 71 fixedly contacts an axial direction second side surface of (an axial direction step portion of) the support wall 4 extending to the radial direction inner side of the first projecting portion 5. The axial direction second side of the support bearing 71 is fixed by a snap ring 71*c* serving as a fixing member attached to the radial direction inside surface of the first projecting portion 5. The snap ring 71*c* is fitted fixedly into a groove portion formed in the radial direction inside surface of the first projecting portion 5. Thus, the first projecting portion 5 positions the support bearing 71 in the axial direction in cooperation with the snap ring 71*c*.

In this embodiment, the rotation sensor 27 of the rotating electrical machine MG is attached to the radial direction outside surface of the first projecting portion 5. The rotation sensor 27 is a sensor for detecting a rotation speed of the rotor 22. The rotation sensor 27 is constituted by a sensor rotor 27*a* and a sensor stator 27*b*, wherein the sensor stator 27*b* is attached to the non-rotary case 2 and the sensor rotor 27*a* is attached to the rotor support member 23. In this example, the radial direction outside surface of the first projecting portion 5 is fitted to the sensor stator 27*b* so as to position the sensor stator 27*b* in the radial direction. In this example, a resolver is used as the rotation sensor 27. Note that various types of sensors other than a resolver may be used as the rotation sensor 27.

The support bearing 71 is attached to the radial direction inside surface of the first projecting portion 5 and the rotation sensor 27 is attached to the radial direction outside surface of the first projecting portion 5, and therefore both the radial direction inside surface and the radial direction outside surface of the first projecting portion 5 can be used effectively to attach the support bearing 71 and the rotation sensor 27. Hence, there is no need to form a new projecting portion to attach the rotation sensor 27 to the support wall 4 or to position the rotation sensor 27 in the radial direction, and therefore the projecting portion can be shared. Further, by forming the projecting portion, a processing precision of a fitting surface used for radial direction positioning can be improved.

In this embodiment, a radial direction positioning portion 27*d* and a coupling portion 27*c* of the sensor stator 27*b* are formed separately. As shown in FIG. 1, in the radial direction positioning portion 27*d*, the radial direction outside surface of the first projecting portion 5 is fitted to a radial direction inside surface of a stator core of the sensor stator 27*b* to position the sensor stator 27*b* in the radial direction, while in the coupling portion 27*c*, the stator core of the sensor stator 27*b* is fixed to the support wall 4 using fastening members such as a nut and a bolt.

The intermediate support wall 90 (see FIG. 2) is shaped to extend in at least the radial direction, and in this embodiment, the intermediate support wall 90 is an annular plate-shaped member that extends in the radial direction and the circumferential direction. The intermediate support wall 90 is fixed to the second case 2*b* by a fastening member such as a bolt. Further, a pump cover 91 (see FIG. 3) is fixed to the intermediate support wall 90 by a fastening member such as a bolt so as to contact the intermediate support wall 90 from the axial direction first side. A pump chamber (not shown) is formed between the intermediate support wall 90 and the pump cover 91, and an oil pump (not shown) is disposed in the pump chamber. An axial direction through hole is formed in a radial direction central portion of the intermediate support wall 90 and the pump cover 91, and the intermediate shaft M is inserted into this through hole so as to penetrate the intermediate support wall 90 and the pump cover 91. The pump cover 91 includes a cylindrical axial direction projecting portion 92 that projects to the axial direction first side (the torque converter TC side) on the periphery of the intermediate shaft M. The axial direction projecting portion 92 is formed integrally with the pump cover 91. A center of the cylindrical axial direction projecting portion 92 corresponds to the axial center X, and therefore the axial direction projecting portion 92 supports rotary members of the hybrid driving apparatus 1, such as the intermediate shaft M and the pump impeller 31, on the axial direction second side of the hybrid driving apparatus 1 to be capable of rotating about the axial center X, as well as positioning these members in the radial direction.

In this embodiment, the oil pump is coupled to the pump impeller 31 so as to rotate integrally therewith, and as the pump impeller 31 rotates, the oil pump discharges oil (hydraulic oil), thereby generating oil pressure for supplying oil to the torque converter TC, the first clutch C1, the speed change mechanism TM, and so on, as well as bearings and support portions such as the support bearing 71, respective needle bearings 72, and respective thrust bearings 73. Note that a plurality of axial center oil passages to be described below are formed in the interior of the intermediate shaft M, and the oil discharged by the oil pump is supplied to respective oil supply sites via an oil pressure control device (not shown) and the plurality of axial center oil passages. In this embodiment, axial center oil passages Lc1, Lc2 are shown in the drawings.

1-2-3. Input Shaft, Intermediate Shaft

The input shaft I is a shaft for inputting the drive power of the engine E into the hybrid driving apparatus 1. As shown in FIG. 3, a tip end portion (a left side end portion in FIG. 3) of the input shaft I is inserted penetratingly into an inner peripheral portion of the damper DP and spline-fitted to a boss portion 82, which is formed on the output side member of the damper DP, to be capable of transmitting torque. Hence, the input shaft I is coupled to an engine output shaft of the engine E via the damper DP so as to rotate integrally therewith. Further, an axial direction first side end portion of the input shaft I is inserted into a hollow cylindrical portion formed in an axial direction second side end portion of the output shaft of the engine E, and a bearing 74 is disposed between a radial direction inside surface of the cylindrical portion of the engine E and a radial direction outside surface of the tip end portion of the input shaft I. Hence, the input shaft I is supported on the output shaft of the engine E to be capable of rotating relative thereto via the bearing 74. As a result, axial center deviation between the axial center X of the input shaft I and the output shaft of the engine E can be suppressed, and rotation vibration caused by axial center deviation between the engine E and the hybrid driving apparatus 1 can be suppressed.

Further, the input shaft I is disposed to penetrate the support wall 4 of the case 2. As described above, an axial direction through hole is formed in the radial direction central portion of the support wall 4 of the case 2, and the input shaft I penetrates this through hole in the support wall 4 of the case 2 in the axial direction. Thus, the input shaft I enables drive power transmission between the engine E and the interior of the hybrid driving apparatus 1. In this example, the input shaft I is disposed so as to penetrate the cylindrical first projecting portion 5 formed on the support wall 4 entirely in the axial direction. As described above, the input shaft I is supported to be capable of rotating about the axial center X and positioned in the radial direction relative to the first projecting portion 5 of the support wall 4 via the support bearing 71, the second projecting portion 6 of the front cover member, and the needle bearing 72a (see FIG. 1). The needle bearing 72a disposed between the input shaft I and the second projecting portion 6 is disposed in a position that overlaps the first projecting portion 5 in the axial direction, and therefore an improvement can be achieved in the precision with which the input shaft I is positioned in the radial direction relative to the first projecting portion 5.

As shown in FIG. 3, the input shaft I is formed in a solid columnar shape on substantially the axial direction first side of an axial direction first side end of the radial direction inside surface of the support wall 4. On substantially the axial direction second side of the axial direction first side end of the radial direction inside surface of the support wall 4, on the other hand, the input shaft I is formed in a hollow cylindrical shape centering on the axial center X. The input shaft I includes an annular plate-shaped hub portion that extends from an axial direction second side end of the hollow cylindrical portion to substantially the radial direction outer side. A first clutch hub 52 formed integrally from a cylindrical member and a substantially annular-plate shaped member extending to the radial direction outer side is coupled to a radial direction outside end of the annular plate-shaped hub portion so as to rotate integrally with the input shaft I. An inner diameter of the hollow cylindrical portion of the input shaft I is formed to be slightly smaller than an outer diameter of the intermediate shaft M so that the intermediate shaft M inserted therein can be supported rotatably and positioned in the radial direction.

The intermediate shaft M is a shaft for inputting torque output by the torque converter TC into the speed change mechanism TM, and is coupled to the turbine runner 41 of the torque converter TC so as to rotate integrally therewith. The intermediate shaft M is disposed to penetrate the intermediate support wall 90 and the pump cover 91. As described above, axial direction through holes are formed in radial direction central portions of the intermediate support wall 90 and the pump cover 91, and the intermediate shaft M penetrates the intermediate support wall 90 and the pump cover 91 through these through holes. More specifically, the intermediate shaft M is disposed to penetrate the through hole provided in the intermediate support wall 90 and the tubular axial direction projecting portion 92 provided in the pump cover 91 entirely in the axial direction. The intermediate shaft M is supported to be capable of rotating relative to the intermediate support wall 90 via a fixing sleeve 49 coupled fixedly to the intermediate support wall 90 by a coupling portion (see FIG. 2), and thus positioned in the radial direction.

The plurality of axial center oil passages Lc1, Lc2 extending in the axial direction are formed in the interior of the intermediate shaft M. As described above, the axial center oil passages Lc1, Lc2 are flow passages for supplying oil discharged by the oil pump to respective oil supply sites. The intermediate shaft M is further provided with oil holes Lh2, Lh4, Lh7 (see FIG. 1) that penetrate the respective axial center oil passages and an outer peripheral surface of the intermediate shaft M in the radial direction so that the oil flows between the respective axial center oil passages Lc1, Lc2 and the respective oil supply sites through the oil holes Lh2, Lh4, Lh7. The oil holes Lh2, Lh4, Lh7 in the respective axial center oil passages Lc1, Lc2 are disposed in different axial direction positions to correspond to axial direction positions of the oil supply sites in the flow passages. In this embodiment, as shown in FIG. 3, the first axial center oil passage Lc1 is a flow passage for supplying oil pressure mainly to the first clutch C1, while the second axial center oil passage Lc2 is a flow passage for supplying oil to the support bearing 71, the interior of the torque converter TC, and so on.

As shown in FIG. 1, the oil hole Lh2 is formed in the first axial center oil passage Lc1 to penetrate the first axial center oil passage Lc1 and the outer peripheral surface of the intermediate shaft M in the radial direction. The oil hole Lh2 is disposed in a position that overlaps a radial direction inside end portion of an oil hole Lh3 formed in the front cover member 32 in the axial direction so that oil pressure is supplied to a first supply oil chamber H1 of the first clutch C1. Here, the oil pressure supplied to the first supply oil chamber H1 of the first clutch C1 is supplied through the oil hole Lh3. Further, an oil hole Lh1 is formed in the input shaft I disposed between the intermediate shaft M and the front cover member 32 in a position that overlaps the oil hole Lh3 in the axial direction so as to penetrate an outer peripheral surface and an inner peripheral surface of the cylindrical portion of the input shaft I in the radial direction. The intermediate shaft M, the input shaft I, and the front cover member 32 rotate relative to each other, and therefore circumferential direction positions of the oil holes Lh1, Lh2, Lh3 are not always aligned. Hence, the intermediate shaft M and the input shaft I respectively include all-around oil passages Lr1, Lr2, which are formed in positions that overlap the oil hole Lh1 and the oil hole Lh2 in the axial direction and withdrawn to the radial direction inner side around the entire periphery of the respective radial direction outside surfaces of the intermediate shaft M and the input shaft I. Oil flows between the oil hole Lh2 and the oil hole Lh1 and between the oil hole Lh1 and the oil hole Lh3 via the all-around oil passages Lr1, Lr2 formed around the respective entire peripheries, and therefore oil can flow at all times, even when the respective circumferential direction positions of the oil holes Lh1, Lh2, Lh3 are not aligned due to relative rotation. Further, sealing rings 77 are disposed respectively between the relatively rotating members on either axial direction side of the all-around oil passages Lr1, Lr2 so that the all-around oil passages Lr1, Lr2 are liquid-tight. As a result, the oil pressure supplied through the first axial center oil passage Lc1 can be supplied to the first supply oil chamber H1 of the first clutch C1. Further, as shown in FIG. 3, oil pressure supplied to a second supply oil chamber H2 of the second clutch C2 is supplied through an axial center oil passage and an oil hole, not shown in the drawings, formed in the intermediate shaft M via an oil hole Lh5 formed in a turbine hub 44.

As shown in FIG. 1, the oil hole Lh4 and the oil hole Lh7 are formed in the second axial center oil passage Lc2 to penetrate the second axial center oil passage Lc2 and the outer peripheral surface of the intermediate shaft M, respectively, in the radial direction. The oil hole Lh4 is an oil hole for supplying oil to friction plates 56 of the first clutch C1, friction plates 66 of the second clutch C2, thrust bearings 73a, 73b, and so on in the torque converter TC, and is disposed in a position that overlaps a radial direction inside end portion of an oil flow passage on the torque converter TC side in the axial direction. In this example, as will be described below, the first clutch C1 and the second clutch C2 are disposed to overlap in the axial direction, and therefore oil can be supplied to the friction plates 56 of the first clutch C1 and the friction plates 66 of the second clutch C2 through the single oil hole Lh4.

The oil hole Lh7 is an oil hole for supplying oil to a space between the input shaft I and the support bearing 71, needle bearing 72a, and intermediate shaft M through the second axial center oil passage Lc2. The oil hole Lh7 is disposed in a position that overlaps an oil hole Lh8, which is formed in the input shaft I in order to supply oil pressure to the needle bearing 72a, in the axial direction. The oil hole Lh8 is formed to penetrate the outer peripheral surface and inner peripheral surface of the hollow cylindrical portion of the input shaft I in the radial direction. The intermediate shaft M and the input shaft I rotate relative to each other, and therefore circumferential direction positions of the oil holes Lh7 and Lh8 are not always aligned. Hence, the intermediate shaft M includes an all-around oil passage Lr3 which is formed in a position that overlaps the oil hole Lh7 in the axial direction and withdrawn to the radial direction inner side around the entire periphery of the radial direction outside surface of the intermediate shaft M. Oil flows between the oil hole Lh7 and the oil hole Lh8 via the all-around oil passage Lr3 formed around the entire periphery, and therefore oil can flow at all times, even when the circumferential direction positions of the oil holes Lh7 and the oil hole Lh8 are not aligned due to relative rotation. Further, the aforementioned sealing ring 77 is disposed between the intermediate shaft M and the input shaft I on the axial direction second side of the all-around oil passage Lr3 so that the all-around oil passage Lr3 is liquid-tight. However, a sealing ring or the like is not disposed between the intermediate shaft M and the input shaft I on the axial direction first side of the all-around oil passage Lr3, and therefore the oil supplied to the all-around oil passage Lr3 is also supplied to a space between the intermediate shaft M and the input shaft I on the axial direction first side of the oil hole Lh7, thereby forming an oil film between the intermediate shaft M and the input shaft I. The oil supplied through the oil hole Lh8 is supplied to the needle bearing 72a and the support bearing 71, as will be described below.

1-2-4. Torque Converter

As shown in FIG. 3, the torque converter TC is disposed on the axial direction second side of the support wall 4 and the rotor support member 23 of the rotating electrical machine MG. In this embodiment, the first clutch C1 is disposed on an inner side of the outer shell support member 30 of the torque converter TC.

The outer shell support member 30 is a cover member forming an outer shell of the torque converter TC, which is drive-coupled to the pump impeller 31 so as to rotate integrally therewith. The pump impeller 31, the turbine runner 41, the first clutch C1, the second clutch C2, and so on are disposed inside the outer shell support member 30. In this embodiment, the outer shell support member 30 is formed by welding a plurality of members. The outer shell support member 30 has a peripheral wall portion covering an outer periphery, and the peripheral wall portion includes a front cover member 32 part that extends in at least the radial direction from an axial direction first side end portion of the peripheral wall portion and a rear cover member 33 part that extends in at least the radial direction from an axial direction second side end portion of the peripheral wall portion. In this embodiment, the front cover member 32 takes an annular plate shape that extends in the radial direction and the circumferential direction, and serves as a part of the outer shell support member 30 that covers the axial direction first side of the torque converter TC. In the following description, unless otherwise indicated, the front cover member 32 forms a part of the outer shell support member 30, regardless of whether or not the members are welded, and more specifically an annular plate-shaped part covering the axial direction first side.

The front cover member 32 includes the tubular second projecting portion 6, which is formed integrally with the front cover member 32 to project to the support wall 4 side (the axial direction first side) in the axial direction from the front cover member 32. In this embodiment, the second projecting portion 6 has a cylindrical shape that projects to the axial direction first side from a radial direction inside end of the front cover member 32. Further, the second projecting portion 6 is supported rotatably and positioned in the radial direction relative to the first projecting portion 5 of the support wall 4 via the support bearing 71. The second projecting portion 6 is disposed to overlap the first projecting portion 5 in the axial direction. In this example, the second projecting portion 6 is disposed to overlap the first projecting portion 5 entirely in the axial direction. Furthermore, as described above, the support bearing 71 is attached between the radial direction inside surface of the first projecting portion 5 and the radial direction outside surface of the second projecting portion 6.

As described above, the radial direction outside surface of the second projecting portion 6 is fitted to the support bearing 71 so that the second projecting portion 6 is positioned in the radial direction relative to the first projecting portion 5 via the support bearing 71. As shown in FIG. 1, on the radial direction outside surface of the second projecting portion 6, the axial direction second side of the support bearing 71 fixedly contacts a projecting portion (an axial direction step portion) of the second projecting portion 6, which projects to the radial direction outer side of the fitting surface of the second projecting portion 6, on the axial direction second side of the fitting surface. Meanwhile, the axial direction first side of the support bearing 71 is fixed by a nut 71d that is screwed from the axial direction first side to the axial direction second side to a screw thread fanned on the radial direction outside surface of the second projecting portion 6. Thus, the second projecting portion 6 positions the support bearing 71 in the axial direction relative to the second projecting portion 6, and the second projecting portion 6 is positioned in the axial direction relative to the first projecting portion 5 via the support bearing 71.

A through hole that penetrates the inner side and the outer side of the outer shell support member 30 in the axial direction is formed in the radial direction inner side of the second projecting portion 6 on the axial direction first side of the outer shell support member 30. The input shaft I penetrates the through hole in the outer shell support member 30 so that the input shaft I is capable of transmitting drive power between the engine E and the torque converter TC. Further, as described above, the radial direction inside surface of the second projecting portion 6 supports the radial direction outside surface of the input shaft I rotatably and positions the input shaft I in the radial direction via the needle bearing 72a and so on. The needle bearing 72a is fixed in the axial direction by a snap ring or the like.

A space between the first projecting portion 5 and the second projecting portion 6, to which the support bearing 71 is attached, is made liquid-tight by an oil seal 71a and an oil seal 71b provided on the axial direction first side and the axial direction second side, respectively. Oil is supplied to a space defined by the oil seal 71a and the oil seal 71b through the oil hole Lh8, as described above. As a result, the support bearing 71 is capable of receiving a supply of oil. In this embodiment, as shown in FIGS. 1 and 3, a cylindrical space between the radial direction inside surface of the first projecting portion 5 and the radial direction outside surface of the second projecting portion 6 is made liquid-tight on the axial direction second side by an annular plate-shaped lid constituting the oil seal 71b. A space between the radial direction inside surface of the first projecting portion 5 and the input shaft I, meanwhile, is made liquid-tight on the axial direction first side by an annular plate-shaped lid constituting the oil seal 71a. The axial direction first side end of the second projecting portion 6 is disposed on the axial direction second side of the oil seal 71a. Hence, the spaces on the radial direction outside surface side and radial direction inside surface side of the second projecting portion 6 are made liquid-tight by the oil seals 71a, 71b such that oil can be supplied to the support bearing 71 and the needle bearing 72a attached to the second projecting portion 6.

As shown in FIG. 3, the oil that is supplied to the space between the first projecting portion 5 and the second projecting portion 6 through the oil hole Lh8 is drained from this space through an oil hole Lh6 formed in the first projecting portion 5 and a drain pipe Lp1. The drained oil is returned to an oil pan, not shown in the drawings, and then resupplied to the respective oil supply sites by the oil pump in the manner described above.

The front cover member 32 further includes a cylindrical projecting portion that projects from a radial direction inside end of the front cover member 32 to the axial direction second side on the opposite side to the second projecting portion 6, and a radial direction outside surface of this projecting portion supports constitutional components of the first clutch C1 such as a first piston 54 and a first return spring 55.

As shown in FIG. 1, the front cover member 32 includes, on the radial direction outer side of the second projecting portion 6 and the radial direction inner side of the torque transmitting coupling portion 13, to be described below, a front cover member side fitting portion of the positioning fitting portion 12 for fitting the rotor support member 23, to be described below, to the front cover member 32 so that the rotor support member 23 is positioned in the radial direction. More specifically, the front cover member 32 includes a third projecting portion 7 projecting to the support wall 4 side (the axial direction first side) in the axial direction, and the third projecting portion 7 constitutes the front cover member side fitting portion of the positioning fitting portion 12. A radial direction outside surface of the third projecting portion 7 constitutes a front cover member 32 side fitting surface 7a of the positioning fitting portion 12, and the rotor support member 23 is fitted to the fitting surface 7a on the radial direction outer side of the third projecting portion 7. The third projecting portion 7 is disposed to overlap the rotary support portion 11 constituted by the first projecting portion 5, the second projecting portion 6, and the support bearing 71 in the axial direction. In this embodiment, as shown in FIGS. 1 and 3, the third projecting portion 7 takes a cylindrical shape projecting to the axial direction first side from the front cover member 32, and is disposed near the radial direction outer side of the first projecting portion 5 so as to overlap the first projecting portion 5 in the axial direction. In this example, the third projecting portion 7 is disposed to overlap both the first projecting portion 5 and the second projecting portion 6 entirely in the axial direction. As described above, the third projecting portion 7 of the front cover member 32 positions the rotor support member 23 in the radial direction. Further, as described above, the second projecting portion 6 positions the front cover member 32 in the radial direction relative to the first projecting portion 5 of the support wall 4 via the support bearing 71. Hence, the rotor support member 23 is positioned in the radial direction relative to the first projecting portion 5 of the support wall 4 via the third projecting portion 7 of the front cover member 32.

The front cover member 32 includes, at a remove from the positioning fitting portion 12 on the radial direction outer side of the positioning fitting portion 12, a front cover member 32 side coupling portion 13a of the torque transmitting coupling portion 13, which couples the rotor support member 23 and the front cover member 32 to each other to be capable of transmitting torque. The coupling portion 13a of the front cover member 32 is disposed to overlap the rotary support portion 11 in the axial direction. The coupling portion 13a of the front cover member 32 is formed to project to the rotor support member 23 side (the axial direction first side) in the axial direction so that an axial direction first side contact surface thereof, which contacts the rotor support member 23, can be subjected to plane forming processing or so that a radial direction position of the contact surface, to which torque is transmitted, can be defined. In this embodiment, the coupling portion 13a of the front cover member 32 is coupled to a coupling portion 13b of the rotor support member 23 to be capable of transmitting torque, and the coupling portion 13a drive-couples the rotor 22 to the pump impeller 31 of the torque converter TC so as to rotate integrally therewith.

In this embodiment, as shown in FIGS. 1 and 3, the coupling portion 13a of the front cover member 32 is formed near the radial direction outside end of the front cover member 32. The coupling portion 13b of the rotor support member 23 is fixed to the coupling portion 13a of the front cover member 32 from the axial direction first side by a coupling mechanism 13c such as a bolt or a washer so as to rotate integrally therewith. A bolt insertion hole that opens onto the axial direction first side and a screw thread are formed in the coupling portion 13a of the front cover member 32, and a bolt is inserted into the bolt insertion hole from the axial direction first side and tightened. In this example, an axial direction bolt insertion hole is formed in the coupling portion 13a of the front cover member 32, leading to an increase in stress, and therefore an axial direction member thickness of the coupling portion 13a is increased such that the coupling portion 13a also projects to the axial direction second side.

As described above, the coupling portion 13a of the front cover member 32 is formed to project to the axial direction first side so that the axial direction first side contact surface contacting the rotor support member 23 can be subjected to plane forming processing and the like, while the axial direction first side surface of the front cover member 32 is withdrawn to the axial direction second side (the opposite side to the rotor support member 23) relative to the contact surface of the connecting portion 13a with the rotor support member 23 on the radial direction inner side of the coupling portion 13a. Using this withdrawn part, the rotor support member 23 is provided with an offset portion 14 which is offset to the front cover member 32 side (the axial direction second side) in the axial direction on the radial direction inner side of the torque transmitting coupling portion 13, as will be described below. Furthermore, in this example, the coupling portion 13a of the front cover member 32 includes an attachment portion for the coupling mechanism 13c in a plurality of circumferential direction locations.

A cylindrical member extending from an axial direction second side surface of the front cover member 32 to the axial direction second side is coupled to the front cover member 32. This cylindrical member constitutes a pump impeller 31 side support member for the first clutch C1 and the second clutch C2, and serves as a shared support member 50 shared by the first clutch C1 and the second clutch C2. In the following description, the shared support member 50 will be referred to as a first clutch support member 51 when used as a first clutch C1 side constitutional component and as a second clutch support member 62 when used as a second clutch C2 side constitutional component. The friction plates 56 of the first clutch C1 are attached to a radial direction inside surface of the shared support member 50, and the friction plates 66 of the second clutch C2 are attached to a radial direction outside surface. Thus, the first clutch C1 and the second clutch C2 are disposed by making effective use of the radial direction inside and outside surfaces of the shared support member 50.

The first clutch hub 52, which is coupled to the input shaft I as described above, is attached to the radial direction inner side of the friction plates 56 of the first clutch C1. More specifically, the friction plates 56 are disposed between the first clutch support member 51 and the first clutch hub 52 such that the first clutch support member 51 and the first clutch hub 52 of the first clutch C1 are engaged and disengaged via the friction plates 56, as will be described below. Meanwhile, a second clutch hub 61 coupled to the turbine runner 41 is attached to the radial direction outer side of the friction plates 66 of the second clutch C2. More specifically, the friction plates 66 are disposed between the second clutch support member 62 and the second clutch hub 61 such that the second clutch support member 62 and the second clutch hub 62 of the second clutch C2 are engaged and disengaged via the friction plates 66, as will be described below. The second clutch hub 61 is a member fanned integrally from a cylindrical member and an annular plate-shaped member extending to the radial direction outer side from a radial direction outside surface of the turbine hub 44 coupled to the intermediate shaft M. The second clutch hub 61 is coupled to the intermediate shaft M and the turbine runner 41 via the turbine hub 44 so as to rotate integrally therewith. Hence, by providing the shared support member 50 for the first clutch C1 and the second clutch C2 on the axial direction second side of the front cover member 32, the first clutch C1 and the second clutch C2 are disposed to overlap in the axial direction, and therefore the first clutch C1 and the second clutch C2 can be disposed by making effective use of the space on the axial direction second side of the front cover member 32, enabling a reduction in the overall axial direction length of the hybrid driving apparatus 1.

The rear cover member 33 is an annular member that is formed to cover the axial direction second side of the pump impeller 31 and the torque converter TC, has a circular hole in a radial direction central portion, and is shaped such that a cross-section thereof bends into an arc shape projecting toward the axial direction second side. A large number of vane-shaped blades are fixed to an inner side of the part bent into an arc shape, thereby forming the pump impeller 31. A cylindrical hub extending to the axial direction second side from a radial direction inside end portion of the rear cover member 33 is formed on the rear cover member 33. As described above, the hub of the rear cover member 33 is supported rotatably and positioned in the radial direction relative to the pump cover 91, which is fixed to the intermediate support wall 90 constituting a part of the case 2, via a needle bearing 72b. Further, an axial direction second side end portion (not shown) of the hub of the rear cover member 33 is coupled to an inner rotor of the oil pump so as to rotate integrally therewith.

The turbine runner 41 of the torque converter TC includes a turbine cover 42, blades, and the turbine hub 44. The turbine cover 42 is an annular member that is disposed between the second clutch C2 and the rear cover member 33 in the axial direction, has a circular hole in a radial direction central portion, and is shaped such that a cross-section thereof bends into an arc shape projecting toward the axial direction first side. A large number of vane-shaped blades are formed on the turbine cover 42. The large number of blades formed on the turbine runner 41 are disposed opposite the large number of blades of the pump impeller 31 at predetermined intervals relative thereto in the axial direction. A radial direction inside end portion of the turbine cover 42 is coupled to the turbine hub 44 via a coupling member such as a rivet so as to rotate integrally therewith. A radial direction inside end portion of the turbine hub 44 is coupled to the intermediate shaft M by a spline fitting, and thus the turbine hub 44 rotates integrally with the intermediate shaft M.

The stator 46 of the torque converter TC includes blades, a one-way clutch 48, and the fixing sleeve 49. The blades of the stator 46 are provided in a large number, and these blades are disposed between the blades of the pump impeller 31 and the blades of the turbine runner 41 in the axial direction. Further, the blades are coupled to the fixing sleeve 49 via the one-way clutch 48 such that rotation thereof to a circumferential direction first side is permitted but rotation thereof to a circumferential direction second side is restricted. The fixing sleeve 49 is fixed to the intermediate support wall 90 such that an outer peripheral surface of an axial direction second side end portion thereof contacts an inner peripheral surface of the through hole formed in the radial direction central portion of the intermediate support wall 90 (see FIG. 2). The radial direction inside surface of the fixing sleeve 49 supports the intermediate shaft M rotatably via a bearing, not shown in the drawings, and positions the intermediate shaft M in the radial direction. Hence, on the axial direction second side, the intermediate shaft M is supported rotatably and positioned in the radial direction relative to the intermediate support wall 90 of the case 2 via the fixing sleeve 49. Note that an annular torque converter unit is formed by the pump impeller 31, the turbine runner 41, and the stator 46.

The second clutch C2 is a frictional engagement device for drive-coupling the pump impeller 31 and the turbine runner 41 of the torque converter TC selectively. To realize this function, the second clutch C2 includes, as shown in FIG. 3, the second clutch support member 62 coupled to the front cover member 32, which is coupled to the pump impeller 31, so as to rotate integrally therewith, the second clutch hub 61 coupled to the turbine hub 44 of the turbine runner 41 so as to rotate integrally therewith, the friction plates 66, the turbine hub 44 functioning as a second clutch drum, and a second piston 64. The second piston 64 is biased to the axial direction second side by a second return spring 65. Further, the liquid-tight second supply oil chamber H2 is formed between the turbine hub 44 and the second piston 64, and oil controlled to a predetermined oil pressure by the oil pressure control device is supplied to the second supply oil chamber H2 via an axial center oil passage, not shown in the drawings, formed in the intermediate shaft M and the oil hole Lh5 formed in the turbine hub 44. When the oil pressure in the second supply oil chamber H2 rises beyond a biasing force of the second return spring 65, the second piston 64 moves in a direction for increasing a volume of the second supply oil chamber H2 (in this example, to the axial direction first side), thereby engaging the friction plates 66 with each other. As a result, the drive power of one or both of the engine E and the rotating electrical machine MG is transmitted directly to the intermediate shaft M via the second clutch C2.

1-2-5, First Clutch

As described above, the first clutch C1 is a frictional engagement device for drive-coupling the engine E to the torque converter TC and rotating electrical machine MG selectively. To realize this function, the first clutch C1 includes, as shown in FIG. 3, the first clutch hub 52 coupled to the input shaft I so as to rotate integrally therewith, the first clutch support member 51 coupled to the front cover member 32, which is coupled to the pump impeller 31, so as to rotate integrally therewith, the friction plates 56, and the first piston 54. Note that the front cover member 32 and the first clutch support member 51 function as a first clutch drum. The first piston 54 is biased to the axial direction first side by the first return spring 55. Further, the liquid-tight first supply oil chamber H1 is formed between the first clutch drum and the first piston 54, and oil controlled to a predetermined oil pressure by the oil pressure control device is supplied to the first supply oil chamber H1 via the first axial center oil passage Lc1, the oil hole Lh3 formed in the front cover member 32, and so on, as described above (see FIG. 1). When the oil pressure in the first supply oil chamber H1 rises beyond a biasing force of the first return spring 55, the first piston 54 moves in a direction for increasing a volume of the first supply oil chamber H1 (in this example, to the axial direction second side), thereby engaging the friction plates 56 with each other. As a result, the drive power of the engine E is transmitted from the engine E to the pump impeller 31 and the rotating electrical machine MG via the first clutch C1.

1-2-6. Rotating Electrical Machine

As shown in FIG. 3, the rotating electrical machine MG is disposed adjacent to the support wall 4 of the case 2 on the axial direction second side of the support wall 4. The stator 21 and the rotor 22 of the rotating electrical machine MG are disposed on the radial direction outer side of the front cover member 32. The stator 21 of the rotating electrical machine MG is fixed to the case 2 by a fastening member such as a bolt. The rotor 22 is supported rotatably and positioned in the radial direction relative to the case 2 via the rotor support member 23, the front cover member 32, and so on, as described above. Note that the rotating electrical machine MG is disposed coaxially with the input shaft I and the intermediate shaft M, and therefore the axial center X of the rotor 22 matches a rotary axis center of the input shaft I and the intermediate shaft M. Further, the rotor 22 is coupled to the pump impeller 31 of the torque converter TC via the rotor support member 23 and the front cover member 32 so as to rotate integrally therewith.

As shown in FIGS. 1 and 3, the rotor support member 23 is provided to support the rotor 22 while extending in at least the radial direction. The rotor support member 23 is disposed in a space on the axial direction second side of the support wall 4 and the axial direction first side of the front cover member 32, or in other words a space between the support wall 4 and the front cover member 32. Here, the positioning fitting portion 12 that positions the rotor support member 23 in the radial direction by fitting the rotor support member 23 to the front cover member 32 is provided across the rotor support member 23 and the front cover member 32. The rotor support member 23 includes a rotor support member 23 side fitting portion of the positioning fitting portion 12. More specifically, the rotor support member 23 includes a rotor support member 23 side fitting surface 23a that is fitted to the radial direction outside surface 7a of the third projecting portion 7 formed on the front cover member 32. In this embodiment, the rotor support member 23 is provided to extend toward the radial direction inner side from the rotor 22, and is constituted by an annular plate-shaped member having a circular hole in a radial direction central portion thereof. In order to support an inner peripheral surface of the rotor 22, the rotor support member 23 according to this example includes an integrally fowled tubular cylindrical portion that projects to the axial direction first and second sides from a radial direction outside end of the annular plate-shaped member. The inner peripheral surface of the rotor 22 contacts an outer peripheral surface portion of the cylindrical portion and is thereby fixed.

The radial direction inside surface of the rotor support member 23 serves as a rotor support member 23 side fitting portion (the fitting surface 23a) of the positioning fitting portion 12 fitted to the front cover member 32. The positioning fitting portion 12 is disposed to overlap the rotary support portion 11 in the axial direction. In this example, the positioning fitting portion 12 is disposed to overlap both the first projecting portion 5 and the second projecting portion 6 entirely in the axial direction. Further, the positioning fitting portion 12 is disposed to overlap the rotor 22 in the axial direction. Note that the positioning fitting portion 12 encompasses the entirety of the front cover member 32 side fitting portion and the rotor support member 23 side fitting portion. In other words, in this example, the positioning fitting portion 12 is constituted by the entirety of the third projecting portion 7 and the radial direction inside fitting surface 23a of the rotor support member 23.

The rotor support member 23 includes, at a remove from the positioning fitting portion 12 on the radial direction outer side of the positioning fitting portion 12, the rotor support member 23 side coupling portion 13b of the torque transmitting coupling portion 13, which couples the rotor support member 23 and the front cover member 32 to be capable of transmitting torque. The coupling portion 13b of the rotor support member 23 is disposed to overlap the rotary support portion 11 in the axial direction. In this embodiment, the coupling portion 13b of the rotor support member 23 contacts a contact surface that is formed on the coupling portion 13a of the front cover member 32 so as to project to the axial direction first side. The coupling portion 13b of the rotor support member 23 is coupled to the coupling portion 13a of the front cover member 32 to be capable of transmitting torque, and drive-couples the rotor 22 to the pump impeller 31 of the torque converter TC so that the rotor 22 rotates integrally therewith. In this example, the coupling portion 13b of the rotor support member 23 is fixed to the coupling portion 13a of the front cover member 32 from the axial direction first side by the coupling mechanism 13c such as a bolt or a washer. The torque transmitting coupling portion 13 is disposed to overlap the rotary support portion 11 in the axial direction. Further, the torque transmitting coupling portion 13 and the rotor support member 23 are disposed to overlap the rotor 22 in the axial direction. The torque transmitting coupling portion 13 encompasses the entirety of the front cover member 32 side coupling portion 13a and the rotor support member 23 side coupling portion 13b, and when the coupling mechanism 13c is provided, the torque transmitting coupling portion 13 also includes the coupling mechanism 13c. In other words, in this example, the torque transmitting coupling portion 13 is constituted by all of the coupling portion 13a for the front cover member 32 and the coupling portion 13b and coupling mechanism 13c on the rotor support member 23 side.

Hence, by forming the positioning fitting portion 12 and the torque transmitting coupling portion 13 at a remove from each other such that the positioning fitting portion 12 is disposed on the radial direction inner side and the torque transmitting coupling portion 13 is disposed on the radial direction outer side, the radial direction positioning precision and the torque transmission capacity of the rotor 22 can be improved simultaneously. In other words, the positioning fitting portion 12 does not need to transmit torque, and therefore the member thickness of the rotor support member 23 or the front cover member 32 in the vicinity of the positioning fitting portion 12 can be reduced. As a result, the positioning fitting portion 12 can be processed easily, and an improvement in the processing precision of the fitting surfaces of the front cover member 32 and the rotor support member 23 for positioning these members in the radial direction can be improved. Moreover, the axial direction length of these members in the vicinity of the positioning fitting portion 12 can be shortened. Furthermore, the positioning fitting portion 12 is disposed on the radial direction inner side of the torque transmitting coupling portion 13, and therefore a reduction in a processed circumference can be achieved, enabling a further improvement in the processing precision of the positioning fitting portion 12. Meanwhile, the torque transmitting coupling portion 13 is disposed on the radial direction outer side of the positioning fitting portion 12, enabling an increase in a shaft torque that can be transmitted by the torque transmitting coupling portion 13.

Further, the positioning fitting portion 12 and the torque transmitting coupling portion 13 are respectively disposed to overlap the rotary support portion 11, which is constituted by the first projecting portion 5, the second projecting portion 6, and the support bearing 71, in the axial direction, and therefore the space on the radial direction outer side of the rotary support portion 11 can be used effectively to dispose the positioning fitting portion 12 and the torque transmitting coupling portion 13. As a result, the overall axial direction length of the hybrid driving apparatus 1 can be shortened. Further, the space on the radial direction inner side of the rotor can be used effectively to dispose the first projecting portion 5, the second projecting portion 6, the support bearing 71, the rotor support member 23, the positioning fitting portion 12, and the torque transmitting coupling portion 13, and therefore the overall axial direction length of the hybrid driving apparatus 1 can be shortened.

Furthermore, the third projecting portion 7 is formed to project in the axial direction from the front cover member 32 to the support wall 4 side (the axial direction first side), and therefore the space between the front cover member 32 and the support wall 4 can be used effectively to form the front cover member 32 side fitting surface 7a forming the positioning fitting portion 12. Moreover, by providing the projecting portion, the radial direction outside surface of the projecting portion can be processed with a high degree of precision such that the fitting surface 7a positions the rotor support member 23 in the radial direction with a high degree of precision. As a result, an improvement can be achieved in the processing precision for positioning the positioning fitting portion 12, leading to an improvement in the radial direction positioning precision of the rotor 22.

The rotor support member 23 includes the offset portion 14, which is formed on the radial direction inner side of the torque transmitting coupling portion 13 at an axial direction offset to the front cover member 32 side (the axial direction second side). The rotation sensor 27 is disposed between the support wall 4 and the rotor support member 23 in a position that overlaps the offset portion 14 of the rotor support member 23 in the radial direction. In this embodiment, as described above, the torque transmitting coupling portion 13 of the front cover member 32 projects to the rotor support member 23 side (the axial direction first side) in the axial direction so that it can be subjected to plane forming processing or so that the radial direction position of the contact surface to which torque is transmitted can be defined, and the part of the front cover member 32 on the axial direction inner side of the torque transmitting coupling portion 13 is withdrawn to the opposite side (the axial direction second side) to the rotor support member 23 in the axial direction. Using this withdrawn part, the rotor support member 23 is formed at an offset to the front cover member 32 side (the axial direction second side) in the axial direction on the radial direction inner side of the torque transmitting coupling portion 13. Furthermore, since the rotor support member 23 does not need to transmit torque on the radial direction inner side of the torque transmitting coupling portion 13, the member thickness thereof in the axial direction can be reduced in comparison with the torque transmitting coupling portion 13. This fact can also be used to form the rotor support member 23 at an offset to the front cover member 32 side (the axial direction second side) in the axial direction on the radial direction inner side of the torque transmitting coupling portion 13. By offsetting the radial direction inner side part of the rotor support member 23 to the axial direction second side in this manner, the space between the rotor support member 23 and the support wall 4 can be widened in the axial direction. The rotation sensor 27 is disposed in the space between the rotor support member 23 and the support wall 4, which has been widened in the axial direction. As a result, the overall axial direction length of the hybrid driving apparatus 1 is shortened. Note that when the rotor support member 23 is offset in the axial direction in a certain radial direction position, this means that an axial direction member center line, which is a center line of an axial direction member width of the rotor support member 23 in a certain radial direction position, is moved to the axial direction first side or the axial direction second side parallel to an axial direction member center line of the rotor support member 23 in another radial direction position.

The rotation sensor 27 is disposed to overlap the rotary support portion 11 in the axial direction. In this example, the rotation sensor 27 is disposed to overlap both the first projecting portion 5 and the second projecting portion 6 entirely in the axial direction. The rotation sensor 27 is also disposed to overlap the rotor 22 in the axial direction. Thus, the space on the radial direction outer side of the rotary support portion 11 can be used effectively to dispose the rotation sensor 27. Further, the space on the radial direction inner side of the rotor 22 can also be used effectively to dispose the rotation sensor 27. As a result, the overall axial direction length of the hybrid driving apparatus 1 can be shortened.

The rotor support member 23 includes a tubular fourth projecting portion 8 that projects to the support wall 4 side (the axial direction first side) in the axial direction on the radial direction inner side of the torque transmitting coupling portion 13 and the radial direction outer side of the first projecting portion 5. The fourth projecting portion 8 is disposed to overlap the first projecting portion 5 in the axial direction. The rotation sensor 27 is disposed between a radial direction inside surface of the fourth projecting portion 8 and the radial direction outside surface of the first projecting portion 5. In this embodiment, the fourth projecting portion 8 is formed between the torque transmitting coupling portion 13 and the offset portion 14 of the rotor support member 23 in the radial direction, and takes a cylindrical shape that extends to the axial direction first side. Further, the sensor rotor 27a of the rotation sensor 27 is fixed to the radial direction inside surface of the fourth projecting portion 8 so as to rotate integrally with the rotor support member 23, and thereby positioned in the radial direction. As described above, the sensor stator 27b of the rotation sensor 27 is fixed to the support wall 4 and positioned in the radial direction by the radial direction outside surface of the first projecting portion 5. Further, the fourth projecting portion 8 is disposed to overlap the rotary support portion 11 in the axial direction. In this example, the fourth projecting portion 8 is disposed to overlap both the first projecting portion 5 and the second projecting portion 6 entirely in the axial direction. The fourth projecting portion 8 is disposed to overlap the rotor 22 in the axial direction.

The fourth projecting portion 8 is formed to project to the support wall 4 side in the axial direction from the rotor support member 23, and therefore the space between the rotor support member 23 and the support wall 4 can be used effectively to form the projecting portion for attaching the rotation sensor 27 to the rotor 22 side. Further, the fourth projecting portion 8 is disposed on the radial direction inner side of the torque transmitting coupling portion 13, and therefore the fourth projecting portion 8 can be disposed to avoid the torque transmitting coupling portion 13 in the radial direction and such that the rotation sensor 27 overlaps the offset portion 14 in the radial direction. Furthermore, the rotation sensor 27 can be disposed in a radial direction space formed between the fourth projecting portion 8 and the first projecting portion 5. Hence, the space between the rotor support member 23 and the support wall 4 can be used effectively in the radial direction to dispose the rotation sensor 27, and as a result, an increase in the overall axial direction length of the hybrid driving apparatus 1 can be suppressed.

Further, the support bearing 71 is attached to the radial direction inside surface of the first projecting portion 5 and the rotation sensor 27 is attached to the radial direction outside surface of the first projecting portion 5, and therefore both the radial direction inside surface and the radial direction outside surface of the first projecting portion 5 can be used effectively to attach the support bearing 71 and the rotation sensor 27. Hence, apart from the first projecting portion 5 for supporting the front cover member 32 rotatably on the support wall 4 via the support bearing 71, there is no need to form a new projecting portion for attaching the rotation sensor 27 separately, and therefore the projecting portion can be shared. Accordingly, the space between the front cover member 32 and the support wall 4 can be used effectively in the radial direction to dispose respective constitutional members, and as a result, the overall axial direction length of the hybrid driving apparatus 1 can be shortened.

Furthermore, the space on the radial direction outer side of the rotary support portion 11 can be used effectively to dispose the third projecting portion 7 and the fourth projecting portion 8. Moreover, the space on the radial direction inner side of the rotor 22 can also be used effectively to dispose the third projecting portion 7 and the fourth projecting portion 8. As a result, the overall axial direction length of the hybrid driving apparatus 1 can be shortened.

As described above, in this embodiment, the first projecting portion 5 and the second projecting portion 6 overlap each other entirely in the axial direction, and the third projecting portion 7, fourth projecting portion 8, and rotation sensor 27 are disposed to overlap both the first projecting portion 5 and the second projecting portion 6 entirely in the axial direction. Hence, these constitutional components, i.e. the first projecting portion 5, the second projecting portion 6, the third projecting portion 7, the fourth projecting portion 8, and the rotation sensor 27, are disposed tightly in the axial direction within the axial direction space between the support wall 4 and the front cover member 32 without generating an unnecessary axial direction space, and as a result, the overall axial direction length of the hybrid driving apparatus 1 can be shortened.

2. Second Embodiment

Figure 4:
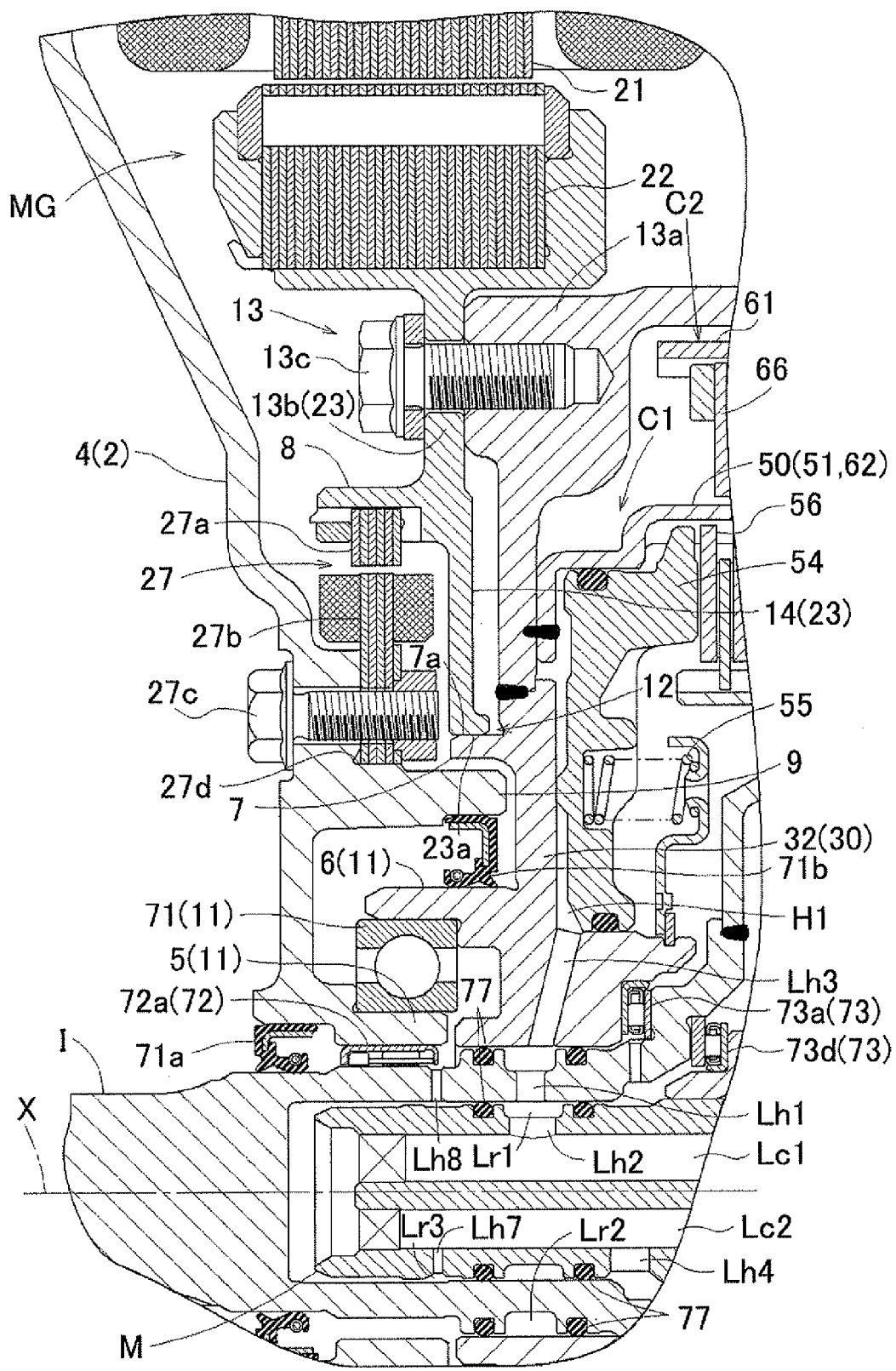
FIG. 4 is a sectional view showing the main parts of a vehicle driving apparatus according to a second embodiment.

A second embodiment of the present invention will now be described on the basis of the drawings. Likewise in this embodiment, a case in which the vehicle driving apparatus according to the present invention is applied to the hybrid driving apparatus 1 will be described as an example. The overall constitution and the constitutions of the respective parts of the hybrid driving apparatus 1 according to this embodiment are basically identical to those of the first embodiment described above. In this embodiment, however, as shown in FIG. 4, a radial direction arrangement of the first projecting portion 5 formed on the support wall 4 and the second projecting portion 6 formed on the front cover member 32 on either side of the support bearing 71 is reversed relative to the first embodiment. Accordingly, a fifth projecting portion 9 is provided anew to fix the rotation sensor 27 to the support wall 4. The arrangement of the oil seals 71a, 71b is also modified. The hybrid driving apparatus 1 according to this embodiment will be described in detail below, centering on differences with the first embodiment. Points not described specifically are assumed to be identical to the first embodiment.

2.1 Driving Apparatus Case

In this embodiment, as shown in FIG. 4, the radial direction arrangement of the first projecting portion 5 formed on the support wall 4 of the case 2 relative to the second projecting portion 6 and the support bearing 71 is different to that of the first embodiment. Specifically, the first projecting portion 5 is disposed on the radial direction inner side of the second projecting portion 6 and the support bearing 71. Furthermore, in this embodiment, the first projecting portion 5 and the second projecting portion 6 overlap partially in the axial direction. In other words, substantially half of the first projecting portion 5 on the axial direction second side and substantially half of the second projecting portion 6 on the axial direction first side overlap in the axial direction. The support bearing 71 is attached between the radial direction outside surface of the first projecting portion 5 and the radial direction inside surface of the second projecting portion 6 in this overlap site. In this example, the radial direction inside surface of the support bearing 71 is fitted to the radial direction outside surface of the first projecting portion 5, and the radial direction inside surface of the second projecting portion 6 is fitted to the radial direction outside surface of the support bearing 71. Thus, the first projecting portion 5 of the support wall 4 supports the second projecting portion 6 rotatably and positions the second projecting portion 6 in the radial direction via the support bearing 71.

Further, the support wall 4 includes the tubular fifth projecting portion 9, which projects to the rotary support member 23 side (the axial direction second side) in the axial direction on the radial direction outer side of the rotary support portion 11, which is constituted by the first projecting portion 5, the second projecting portion 6, and the support bearing 71, and the radial direction inner side of the fourth projecting portion 8. The fifth projecting portion 9 and the fourth projecting portion 8 are disposed to overlap in the axial direction. In this example, the fourth projecting portion 8 is disposed to overlap the fifth projecting portion 9 entirely in the axial direction. The rotation sensor 27 is disposed between the radial direction inside surface of the fourth projecting portion 8 and a radial direction outside surface of the fifth projecting portion 9. The sensor stator 27b of the rotation sensor 27 is fitted to the radial direction outside surface of the fifth projecting portion 9, whereby the sensor stator 27b of the rotation sensor 27 is positioned in the radial direction. In this example, the fifth projecting portion 9 is a cylindrical projecting portion. The radial direction outside surface of the fifth projecting portion 9 is fitted to the radial direction inside surface of the stator core of the sensor stator 27b to position the sensor stator 27b in the radial direction, while in the coupling portion 27c, the stator core of the sensor stator 27b is fixed to the support wall 4 using fastening members such as a nut and a bolt. Further, as well as the positioning fitting portion 12 and the torque transmitting coupling portion 13, the fifth projecting portion 9 is also disposed to overlap the rotary support portion 11 in the axial direction. In this example, the fifth projecting portion 9 is disposed to overlap the rotary support portion 11 entirely in the axial direction. Note that in this embodiment, the first projecting portion 5 and the second projecting portion 6 overlap partially in the axial direction, and therefore the term "overlap the rotary support portion 11 in the axial direction" corresponds to overlapping at least one of the first projecting portion 5 and the second projecting portion 6 in the axial direction. Further, the fifth projecting portion 9 is disposed to overlap the rotor 22 in the axial direction.

Hence, the fourth projecting portion 8 is formed to project to the support wall 4 side (the axial direction first side) in the axial direction from the rotor support member 23 and the fifth projecting portion 9 is formed to project to the rotor support member 23 side (the axial direction second side) in the axial direction from the support wall 4, and therefore the space between the rotor support member 23 and the support wall 4 can be used effectively to form a projecting portion for attaching the rotation sensor 27 to the rotor 22 side and the support wall 4 side. Further, the fourth projecting portion 8 is disposed on the radial direction inner side of the torque transmitting coupling portion 13, and therefore the fourth projecting portion 8 can be disposed to avoid the torque transmitting coupling portion 13 in the radial direction and such that the rotation sensor 27 overlaps the offset portion 14 in the radial direction. Furthermore, the rotation sensor 27 can be disposed in a radial direction space formed between the fourth projecting portion 8 and the fifth projecting portion 9. Hence, the space between the rotor support member 23 and the support wall 4 can be used effectively in the radial direction to dispose the rotation sensor 27, and as a result, an increase in the overall axial direction length of the hybrid driving apparatus 1 can be suppressed.

Further, the fifth projecting portion 9 is formed on the radial direction outer side of the rotary support portion 11, and therefore the rotary support portion 11 can be designed separately from the constitution for attaching the rotation sensor 27, leading to respective improvements in design freedom. Moreover, the support bearing 71 can be attached between the radial direction outside surface of the first projecting portion 5 and the radial direction inside surface of the second projecting portion 6.

The first projecting portion 5 of the support wall 4 supports the input shaft I rotatably and positions the input shaft I in the radial direction via the needle bearing 72a disposed between the radial direction inside surface of the first projecting portion 5 and the radial direction outside surface of the input shaft I. Therefore, the input shaft I can be positioned in the radial direction in a position that overlaps the first projecting portion 5 in the axial direction. Furthermore, the first projecting portion 5 can support the input shaft I directly without the need for another rotary member such as the front cover member 32, and therefore the radial direction positioning precision of the input shaft I can be improved.

The space for attaching the support bearing 71 between the first projecting portion 5 and the second projecting portion 6 is made liquid-tight on the axial direction first side and the axial direction second side by the oil seal 71a and the oil seal 71b, respectively. As described above, oil is supplied to the space defined by the oil seal 71a and the oil seal 71b through the oil hole Lh8. As a result, the support bearing 71 is capable of receiving a supply of oil. In this embodiment, as shown in FIG. 4, a cylindrical space between the radial direction inside surface of the fifth projecting portion 9 and the radial direction outside surface of the second projecting portion 6 is made liquid-tight on the axial direction second side by an annular plate-shaped lid constituting the oil seal 71b. The space between the radial direction inside surface of the first projecting portion 5 and the input shaft I is made liquid-tight on an axial direction first side end portion of the first projecting portion 5 by an annular plate-shaped lid constituting the oil seal 71a. Hence, the spaces on the radial direction outside surface side and radial direction inside surface side of the first projecting portion 5 are made liquid-tight by the oil seals 71a, 71b such that oil can be supplied to the support bearing 71 and the needle bearing 72a attached to the first projecting portion 5.

Other Embodiments (1) In the above embodiments, a case in which the coupling mechanism 13c of the torque transmitting coupling portion 13 is constituted by a bolt or the like was described as an example. However, as long as the rotor support member 23 and the front cover member 32 are coupled to be capable of transmitting torque, the present invention is not limited to this embodiment. For example, in another preferred embodiment of the present invention, the coupling mechanism 13c is constituted by welding or the like.

(2) In the above embodiments, a case in which the front cover member 32 side fitting portion of the positioning fitting portion 12 is constituted by the cylindrical third projecting portion 7 was described as an example. However, the present invention is not limited to this embodiment, and as long as the fitting portion of the front cover member 32 can be fitted to the rotor support member 23 so that the rotor support member 23 is positioned in the radial direction, the front cover member 32 side fitting portion may take any shape. For example, in another preferred embodiment of the present invention, the front cover member 32 side fitting portion is formed in a substantially columnar shape including a fitting surface on the radial direction outer side.

(3) In the above embodiments, a case in which the radial direction outside surface of the third projecting portion 7 is fitted to the rotor support member 23 was described as an example. However, the present invention is not limited to this embodiment, and in another preferred embodiment of the present invention, the radial direction inside surface of the third projecting portion 7 is fitted to the rotor support member 23. In this case, the rotor support member 23 includes a cylindrical portion projecting to the axial direction second side, and a radial direction outside surface of this cylindrical portion of the rotor support member 23 is fitted to the radial direction inside surface of the third projecting portion 7.

(4) In the above embodiments, a case in which the sensor rotor 27a is attached to the fourth projecting portion 8 of the rotor support member 23 and the sensor stator 27b is attached to the first projecting portion 5 (first embodiment) or the fifth projecting portion 9 (second embodiment) of the support wall 4 was described as an example. However, the present invention is not limited to this embodiment, and in another preferred embodiment of the present invention, the fourth projecting portion 8 is not provided, and the sensor rotor 27a is attached directly to the annular plate-shaped part (a main body portion) of the rotor support member 23 on the radial direction inner side of the torque transmitting coupling portion 13 by a fastening member such as a bolt. In a further preferred embodiment of the present invention, the sensor stator 27b is attached to the support wall 4 by the coupling portion 27c in a position removed from the first projecting portion 5 (first embodiment) or the fifth projecting portion 9 (second embodiment) in the radial direction.

(5) In the first embodiment, a case in which the first projecting portion 5 and the second projecting portion 6 overlap entirely in the axial direction and the third projecting portion 7, the fourth projecting portion 8, and the rotation sensor 27 respectively overlap both the first projecting portion 5 and the second projecting portion 6 entirely in the axial direction was described as an example. However, the present invention is not limited to this embodiment, and in another preferred embodiment of the present invention relating to the first embodiment, the first projecting portion 5 and the second projecting portion 6 may overlap partially in the axial direction. In this case, the third projecting portion 7, the fourth projecting portion 8, and the rotation sensor 27 are disposed to overlap at least a part of the first projecting portion 5 or the second projecting portion 6 in the axial direction.

Further, in the second embodiment, a case in which the first projecting portion 5 and the second projecting portion 6 overlap partially in the axial direction and the third projecting portion 7, the fourth projecting portion 8, the fifth projecting portion 9, and the rotation sensor 27 are disposed to overlap at least a part of the first projecting portion 5 or the second projecting portion 6 in the axial direction was described as an example. However, the present invention is not limited to this embodiment, and in another preferred embodiment of the present invention relating to the second embodiment, the first projecting portion 5 and the second projecting portion 6 may overlap entirely in the axial direction. In this case, the third projecting portion 7, the fourth projecting portion 8, the fifth projecting portion 9, and the rotation sensor 27 are disposed respectively to overlap both the first projecting portion 5 and the second projecting portion 6 entirely in the axial direction.

(6) In the above embodiments, a case in which the torque converter TC is used as a power transmission device was described as an example. However, the present invention is not limited to this embodiment, and the power transmission device may be any device that transmits drive power. For example, in another preferred embodiment of the present invention, a fluid coupling including only the pump impeller 31 serving as the drive side rotary member and the turbine runner 41 serving as the driven side rotary member or the like may be used as the power transmission device.

(7) In the above embodiments, a case in which the rotor support member 23 extends from the vicinity of the axial direction center of the radial direction inside surface of the rotor 22 to the radial direction inner side in order to support the rotor 22, and the first projecting portion 5, the second projecting portion 6, the third projecting portion 7, the fourth projecting portion 8, the fifth projecting portion 9, the support bearing 71, the rotor support member 23, the positioning fitting portion 12, the torque transmitting coupling portion 13, and the rotation sensor 27 are respectively disposed to overlap the rotor 22 in the axial direction was described as an example. However, the present invention is not limited to this embodiment, and in another preferred embodiment of the present invention, the rotor support member 23 extends to the radial direction inner side from a location other than the vicinity of the axial direction center of the radial direction inside surface of the rotor 22, for example the vicinity of the axial direction first side end portion, in order to support the rotor 22. In a further preferred embodiment of the present invention, a part of the first projecting portion 5, the second projecting portion 6, the third projecting portion 7, the fourth projecting portion 8, the fifth projecting portion 9, the support bearing 71, the rotor support member 23, the positioning fitting portion 12, the torque transmitting coupling portion 13, and the rotation sensor 27 may be disposed without being partially positioned in an identical position to the rotor 22 in the axial direction.

(8) In the above embodiments, a case in which the rotor support member 23 includes the offset portion 14, which is formed on the radial direction inner side of the torque transmitting coupling portion 13 at an offset to the front cover member 32 side in the axial direction, and the rotation sensor 27 is disposed in a position that overlaps the offset portion 14 in the radial direction was described as an example. However, the present invention is not limited to this embodiment, and in another preferred embodiment of the present invention, the rotor support member 23 does not include the offset portion 14, and instead, the rotor support member 23 is formed in an annular plate shape such that the axial direction member center line thereof remains constant around the entire radial direction. In a further preferred embodiment of the present invention, when the rotor support member 23 does not include an offset portion, the rotation sensor 27 is disposed in a position that overlaps the part of the rotor support member 23 on the radial direction inner side of the torque transmitting coupling portion 13 in the radial direction.

(9) In the above embodiments, a case in which respective parts of the third projecting portion 7, the fourth projecting portion 8, the fifth projecting portion 9, and the rotation sensor 27 are disposed to overlap the rotary support member 11 in the axial direction was described as an example. However, the present invention is not limited to this embodiment, and in another preferred embodiment of the present invention, these members are disposed without sites having an identical position to the rotary support portion 11 in the axial direction.

The present invention can be used favorably in a vehicle driving apparatus having at least two types of drive power sources, such as a rotating electrical machine and an engine, wherein drive power output by at least the rotating electrical machine is output via a power transmission device such as a torque converter.

The invention claimed is:

1. A vehicle driving apparatus comprising a rotating electrical machine having a rotor that rotates about an axial center, a power transmission device to which drive power is transmitted from the rotating electrical machine and an engine, and a case housing the rotating electrical machine and the power transmission device, wherein
- the case comprises a support wall that extends at least to a radial direction inner side and a tubular first projecting portion that is formed integrally with the support wall so as to project from the support wall in an axial direction to the power transmission device side,
- the power transmission device comprises a front cover member extending at least in a radial direction and a tubular second projecting portion that projects to the support wall side in the axial direction,
- the second projecting portion is supported rotatably relative to the first projecting portion via a support bearing,
- the rotor comprises a rotor support member that extends at least to the radial direction inner side to support the rotor,
- a positioning fitting portion is provided on a radial direction outer side of the second projecting portion to fit the rotor support member to the front cover member so that the rotor support member is positioned in the radial direction,
- a torque transmitting coupling portion is provided on the radial direction outer side of the positioning fitting portion at a remove from the positioning fitting portion to couple the rotor support member and the front cover member so as to be capable of transmitting torque,
- the positioning fitting portion and the torque transmitting coupling portion are respectively disposed to overlap a rotary support portion, which is constituted by the first projecting portion, the second projecting portion, and the support bearing, in the axial direction,
- the support bearing is attached between a radial direction outside surface of the first projecting portion and a radial direction inside surface of the second projecting portion,
- the rotor support member comprises a tubular fourth projecting portion that projects to the support wall side in the axial direction on the radial direction inner side of the torque transmitting coupling portion,
- the support wall includes a tubular fifth projecting portion that projects to the rotor support member side in the axial direction on the radial direction outer side of the rotary support portion and the radial direction inner side of the fourth projecting portion,
- the fourth projecting portion and the fifth projecting portion are disposed to overlap each other in the axial direction, and
- the rotation sensor is disposed between a radial direction inside surface of the fourth projecting portion and a radial direction outside surface of the fifth projecting portion.

2. The vehicle driving apparatus according to claim 1, wherein the first projecting portion, the second projecting portion, the support bearing, the rotor support member, the positioning fitting portion, and the torque transmitting coupling portion are respectively disposed to overlap the rotor in the axial direction.

3. The vehicle driving apparatus according to claim 1, wherein the rotor support member includes an offset portion formed on the radial direction inner side of the torque transmitting coupling portion at an offset to the front cover member side in the axial direction, and
- a rotation sensor is disposed between the support wall and the rotor support member in a position that overlaps the offset portion of the rotor support member in the radial direction.

4. The vehicle driving apparatus according to claim 3, wherein the rotation sensor is disposed to overlap the rotary support portion in the axial direction.

5. The vehicle driving apparatus according to claim 3, wherein the rotation sensor is disposed to overlap the rotor in the axial direction.

6. The vehicle driving apparatus according to claim 1, wherein the front cover member comprises a third projecting portion that projects to the support wall side in the axial direction on the radial direction outer side of the second projecting portion, and
- a radial direction outside surface of the third projecting portion constitutes a front cover member side fitting surface of the positioning fitting portion, the rotor support member being fitted to the radial direction outside surface of the third projecting portion.

7. The vehicle driving apparatus according to claim 6, wherein the third projecting portion is disposed to overlap the rotary support portion in the axial direction.

8. The vehicle driving apparatus according to claim 7, wherein the third projecting portion is disposed to overlap the rotor in the axial direction.

9. The vehicle driving apparatus according to claim 1, wherein the fourth projecting portion and the fifth projecting portion are respectively disposed to overlap the rotary support portion in the axial direction.

10. The vehicle driving apparatus according to claim 1, wherein the fourth projecting portion and the fifth projecting portion are respectively disposed to overlap the rotor in the axial direction.

* * * * *